United States Patent [19]
Yagyu

[11] Patent Number: 6,133,894
[45] Date of Patent: Oct. 17, 2000

[54] DRIVING METHOD FOR OPTICAL APPARATUS

[75] Inventor: Mineto Yagyu, Sagamihara, Japan

[73] Assignee: Canon Kabushiki Kaisha, Tokyo, Japan

[21] Appl. No.: 08/990,048

[22] Filed: Dec. 12, 1997

[30] Foreign Application Priority Data

Dec. 17, 1996 [JP] Japan .................................. 8-336932
Dec. 17, 1996 [JP] Japan .................................. 8-336933

[51] Int. Cl.⁷ .................................................. G09G 3/36
[52] U.S. Cl. .................................. 345/89; 345/87; 349/25
[58] Field of Search .............................. 345/147, 87, 89, 345/102; 349/25, 29, 173, 85, 30

[56] References Cited

U.S. PATENT DOCUMENTS

| | | | |
|---|---|---|---|
| 4,709,995 | 12/1987 | Kuribayashi et al. | 350/350 S |
| 4,712,877 | 12/1987 | Okada et al. | 350/350 S |
| 4,747,671 | 5/1988 | Takahashi et al. | 350/336 |
| 4,763,994 | 8/1988 | Kaneko et al. | 350/336 |
| 4,796,980 | 1/1989 | Kaneko et al. | 350/350 S |
| 5,058,994 | 10/1991 | Mihara et al. | 359/56 |
| 5,221,980 | 6/1993 | Yamamoto et al. | 359/56 |
| 5,311,206 | 5/1994 | Nelson | 345/89 |
| 5,818,553 | 10/1998 | Koenck et al. | 345/102 |
| 5,856,814 | 1/1999 | Yagyu | 345/89 |

FOREIGN PATENT DOCUMENTS

| | | |
|---|---|---|
| 0 361 981 | 4/1990 | European Pat. Off. . |
| 0 453 033 | 10/1991 | European Pat. Off. . |
| 56-88193 | 7/1981 | Japan . |

*Primary Examiner*—Dennis-Doon Chow
*Attorney, Agent, or Firm*—Fitzpatrick, Cella, Harper & Scinto

[57] ABSTRACT

An optical apparatus includes an optical modulation means having a pair of electrodes, and a photoconductor layer and an optical modulation substance layer disposed between the electrodes, a signal light source for supplying light data carrying gradation data to the photoconductor layer, and a readout light illuminator for supplying readout light for reading out picture data to the optical modulation substance layer. The readout light illuminator is driven so as to supply readout light having a planar light intensity distribution providing a constant product of a gradation period and a readout light intensity at each readout site of the optical modulation substance, or so as to scan the photoconductor layer with the light data frame by frame in mutually different scanning directions in succeeding frames.

12 Claims, 30 Drawing Sheets

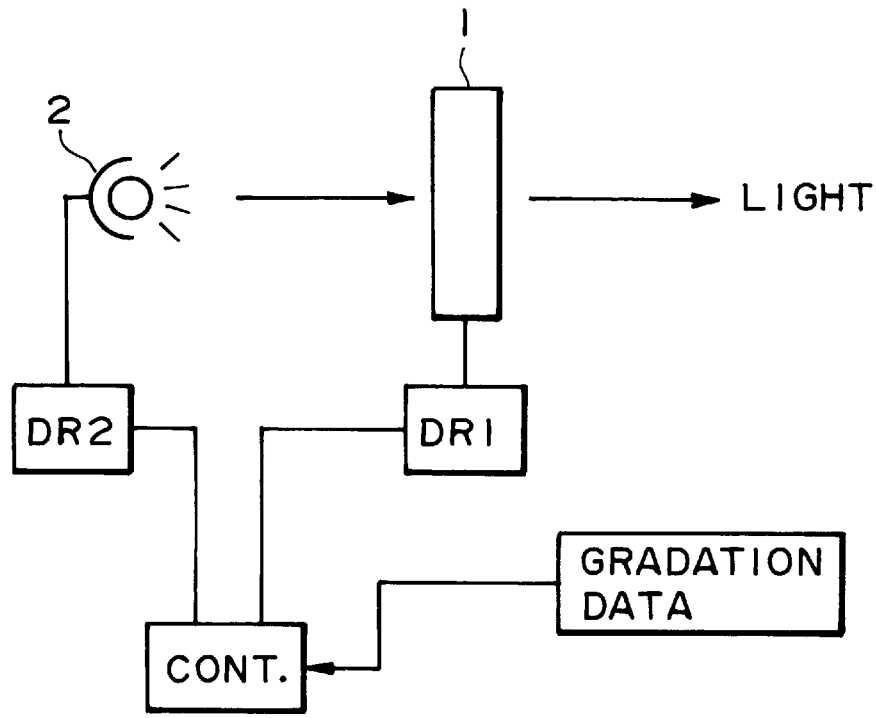
F I G. 1
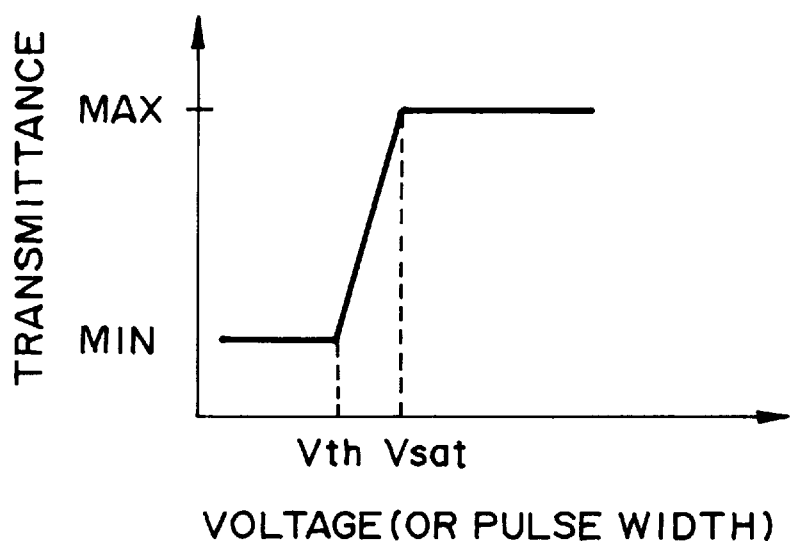
F I G. 2

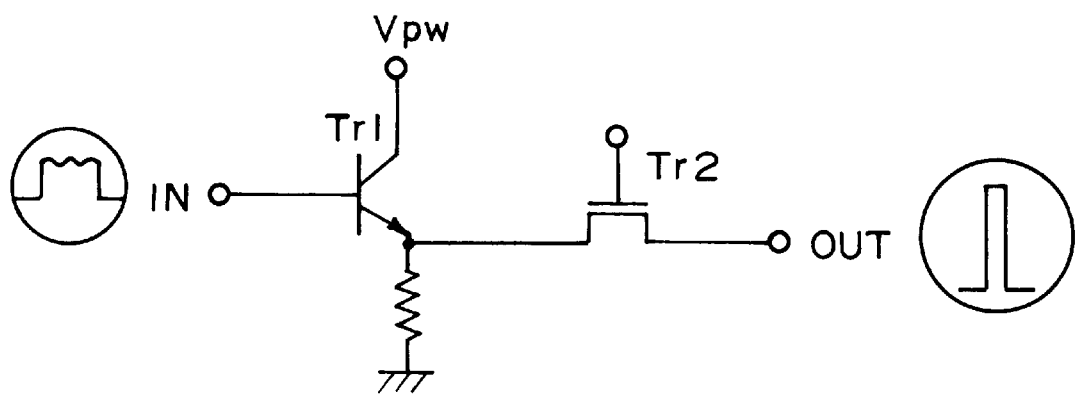
F I G. 4
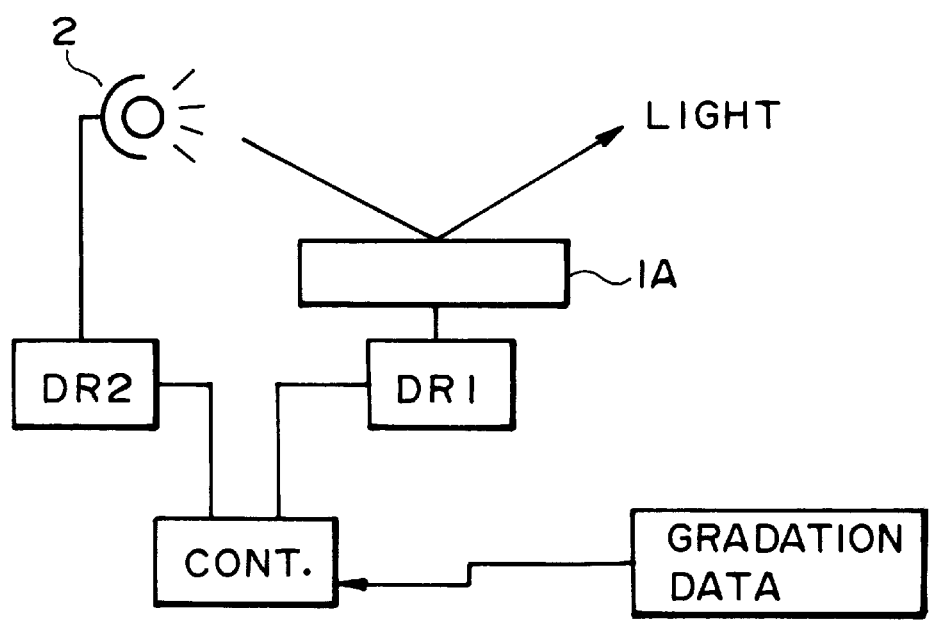
F I G. 5

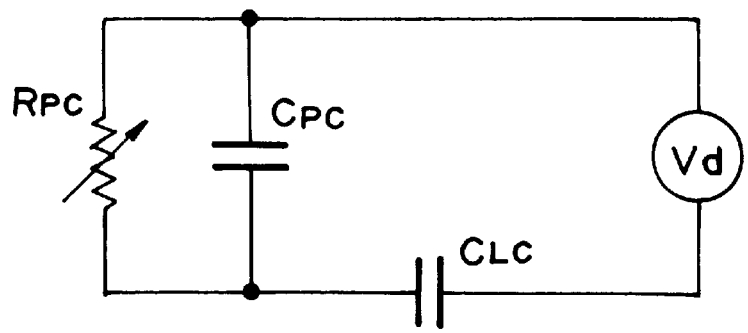
F I G. 6
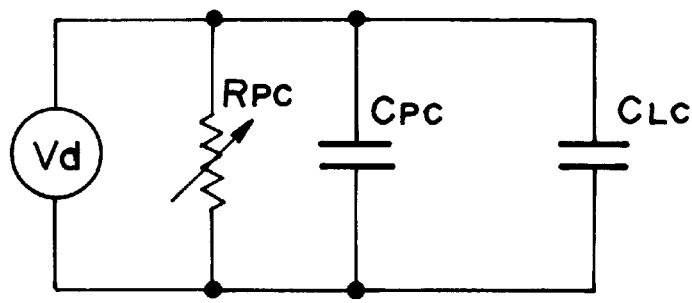
F I G. 7
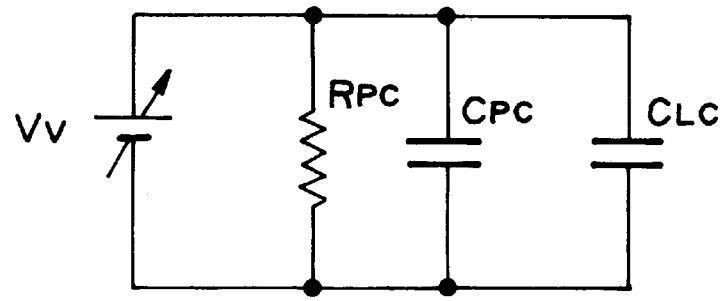
F I G. 8

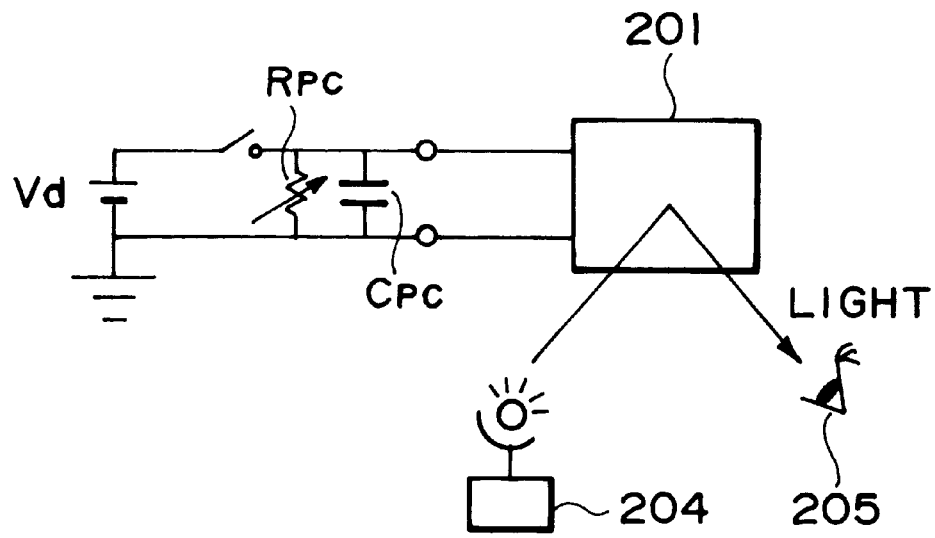
F I G. 12
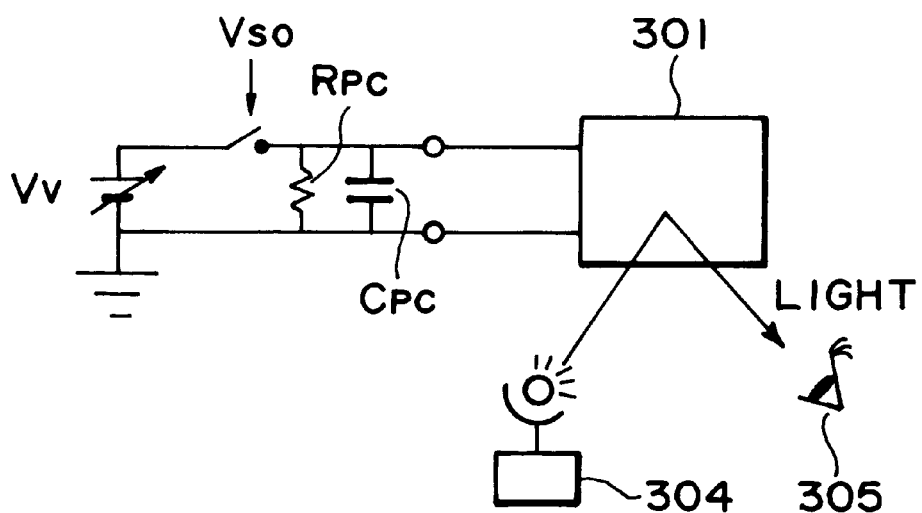
F I G. 14

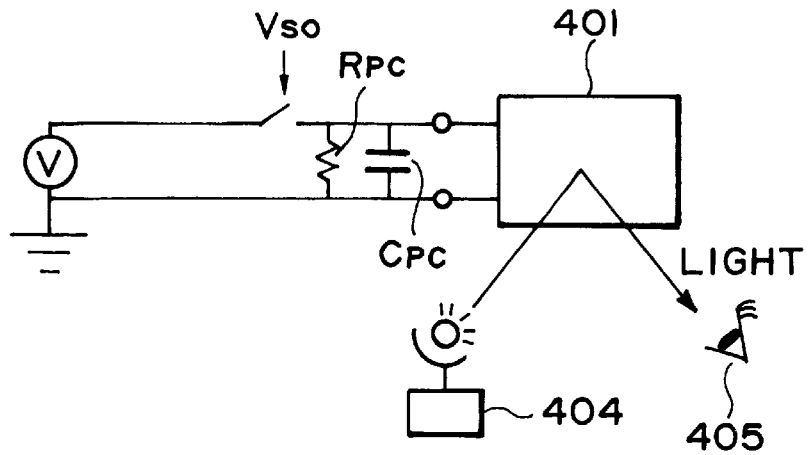
F I G. 16
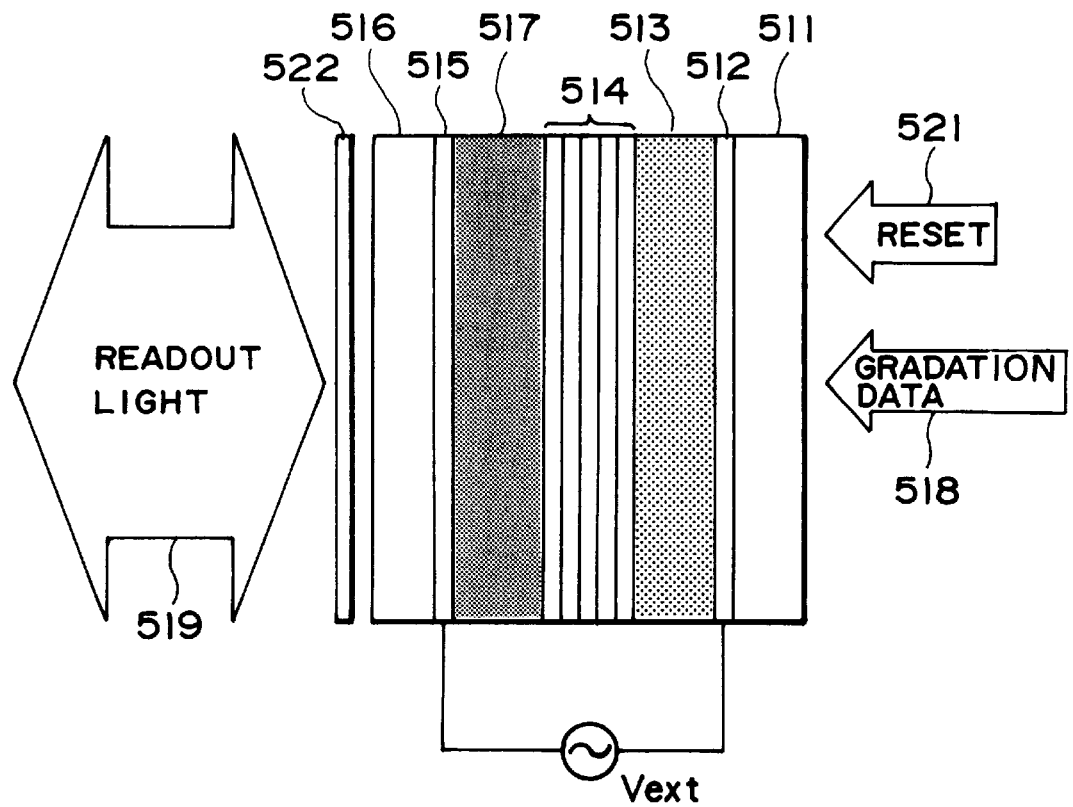
F I G. 18

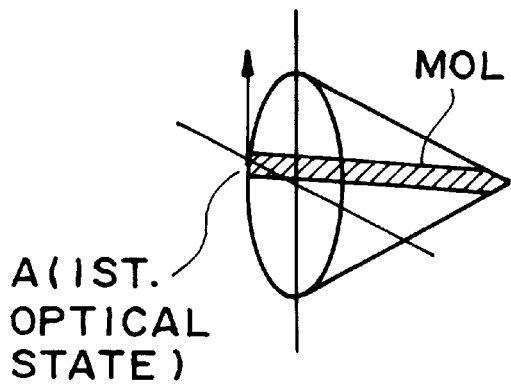
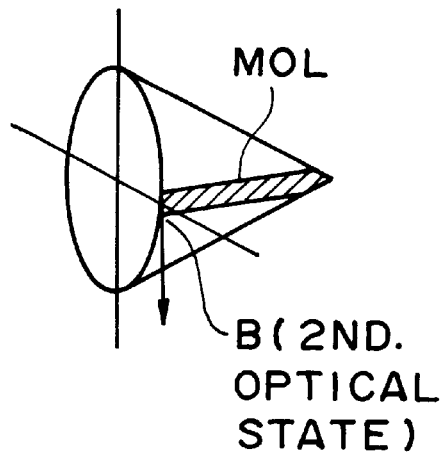
F I G. 19A    F I G. 19B
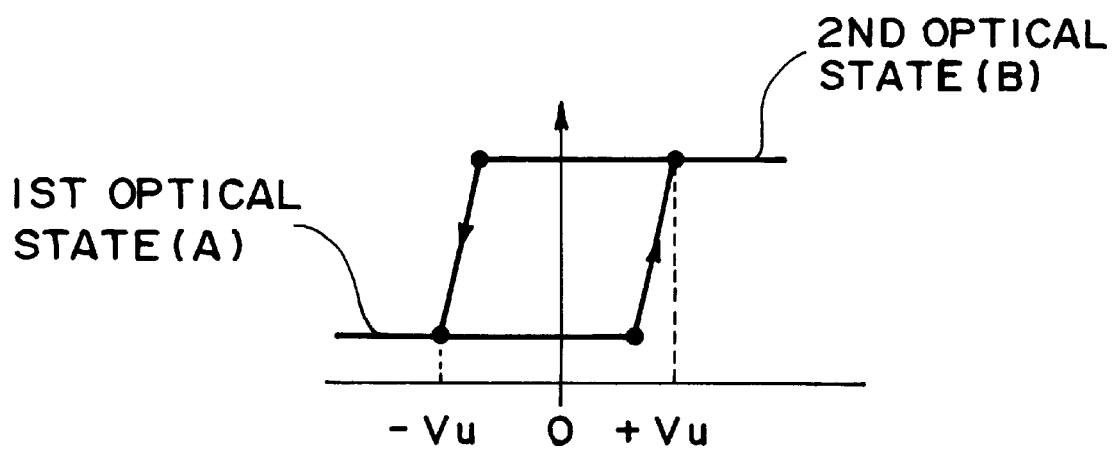
F I G. 20

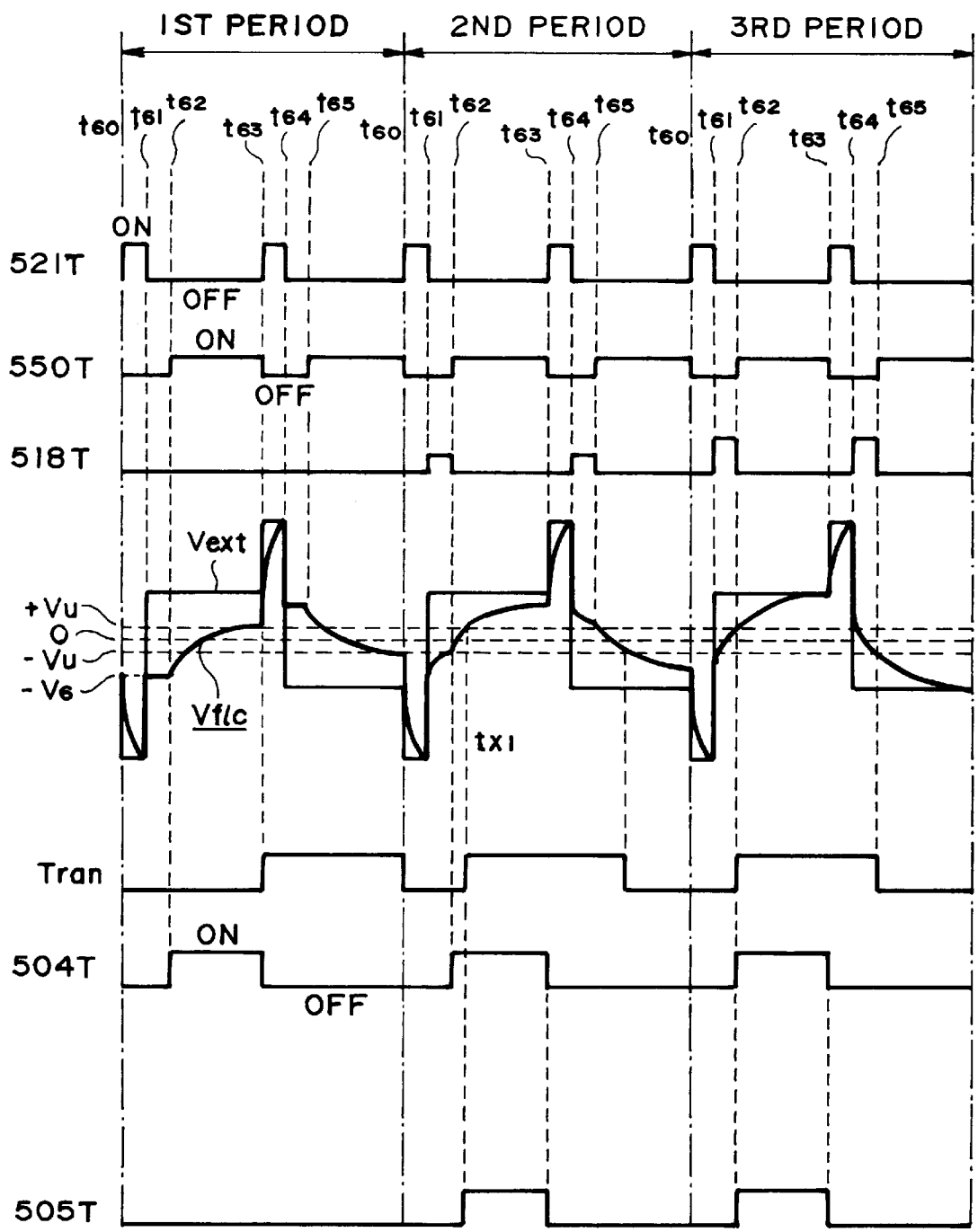
F I G. 24

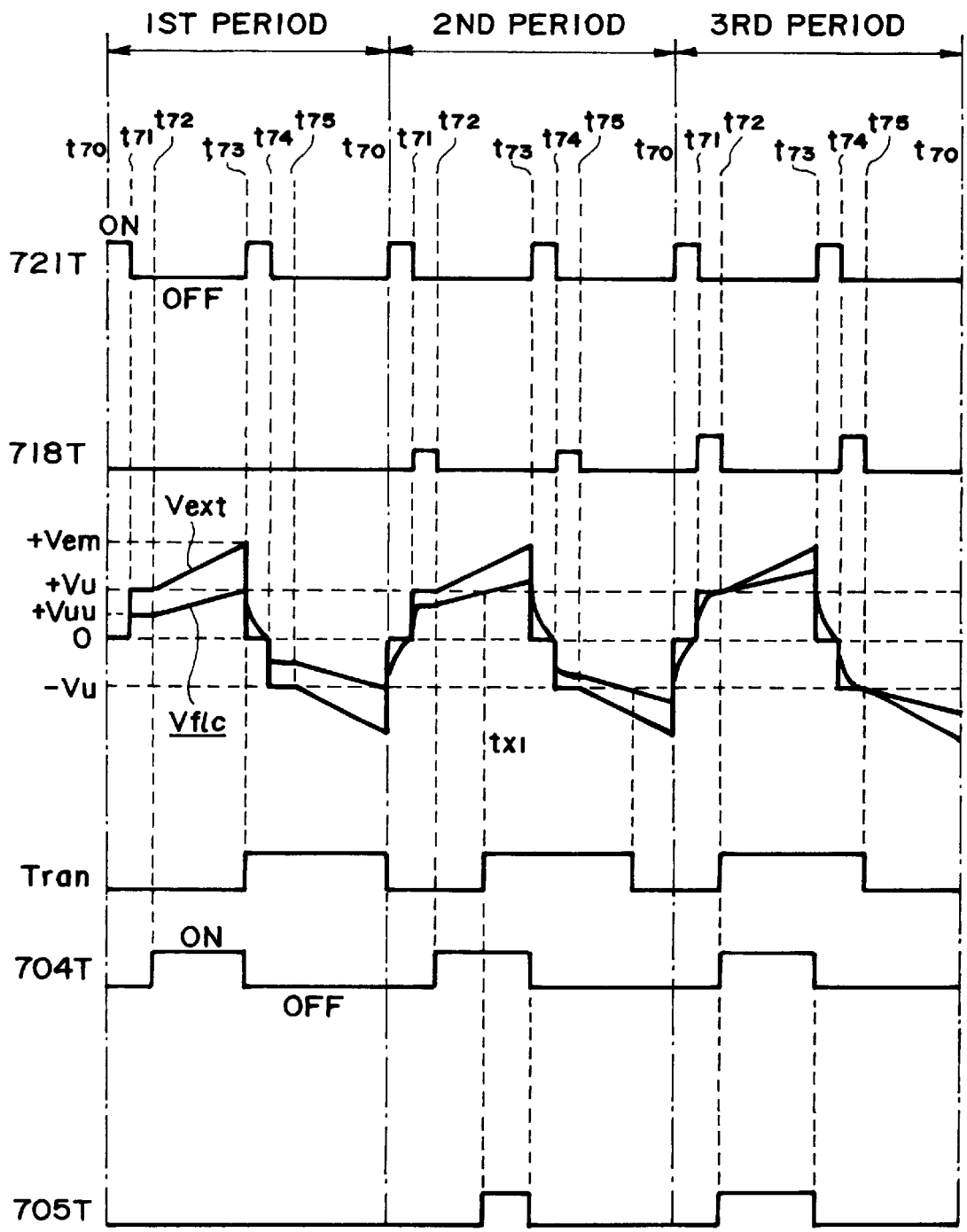
F I G. 25

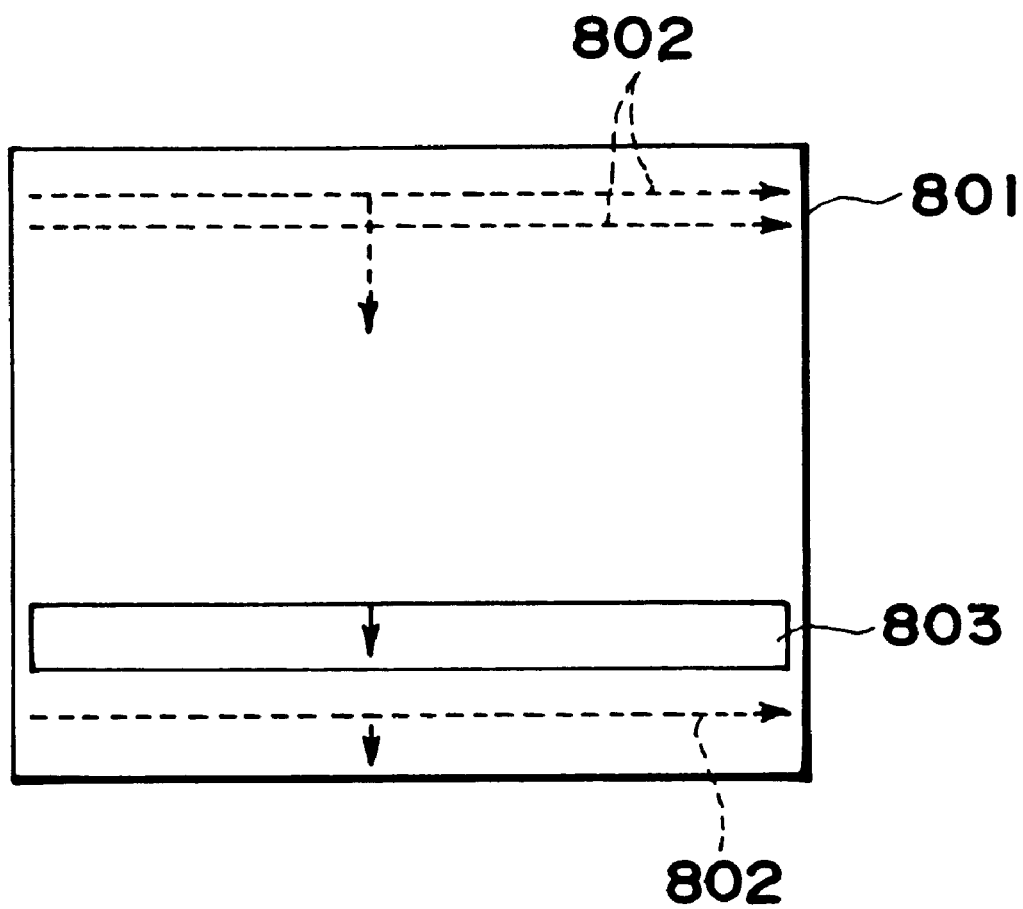
F I G. 26

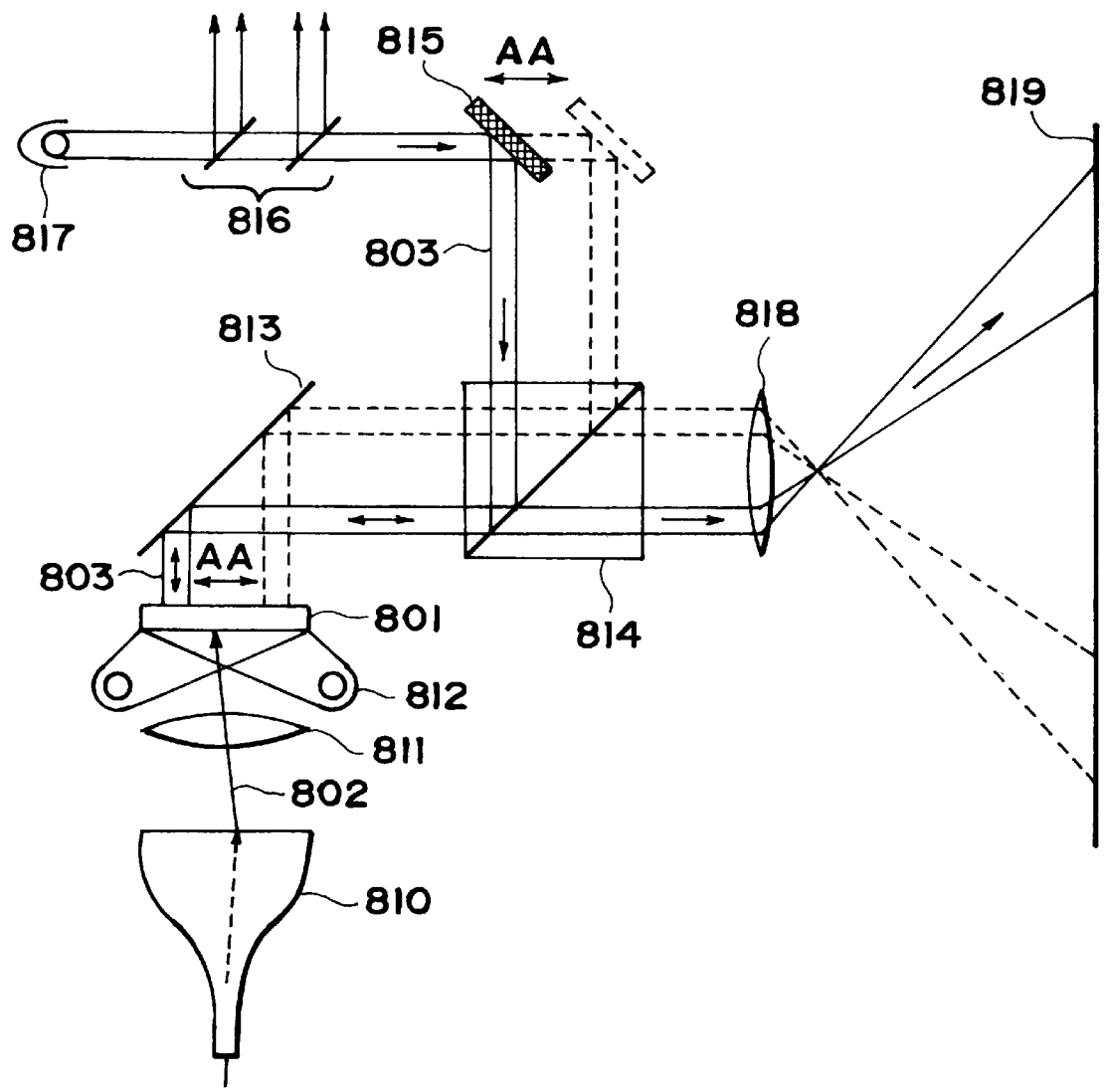
F I G. 27

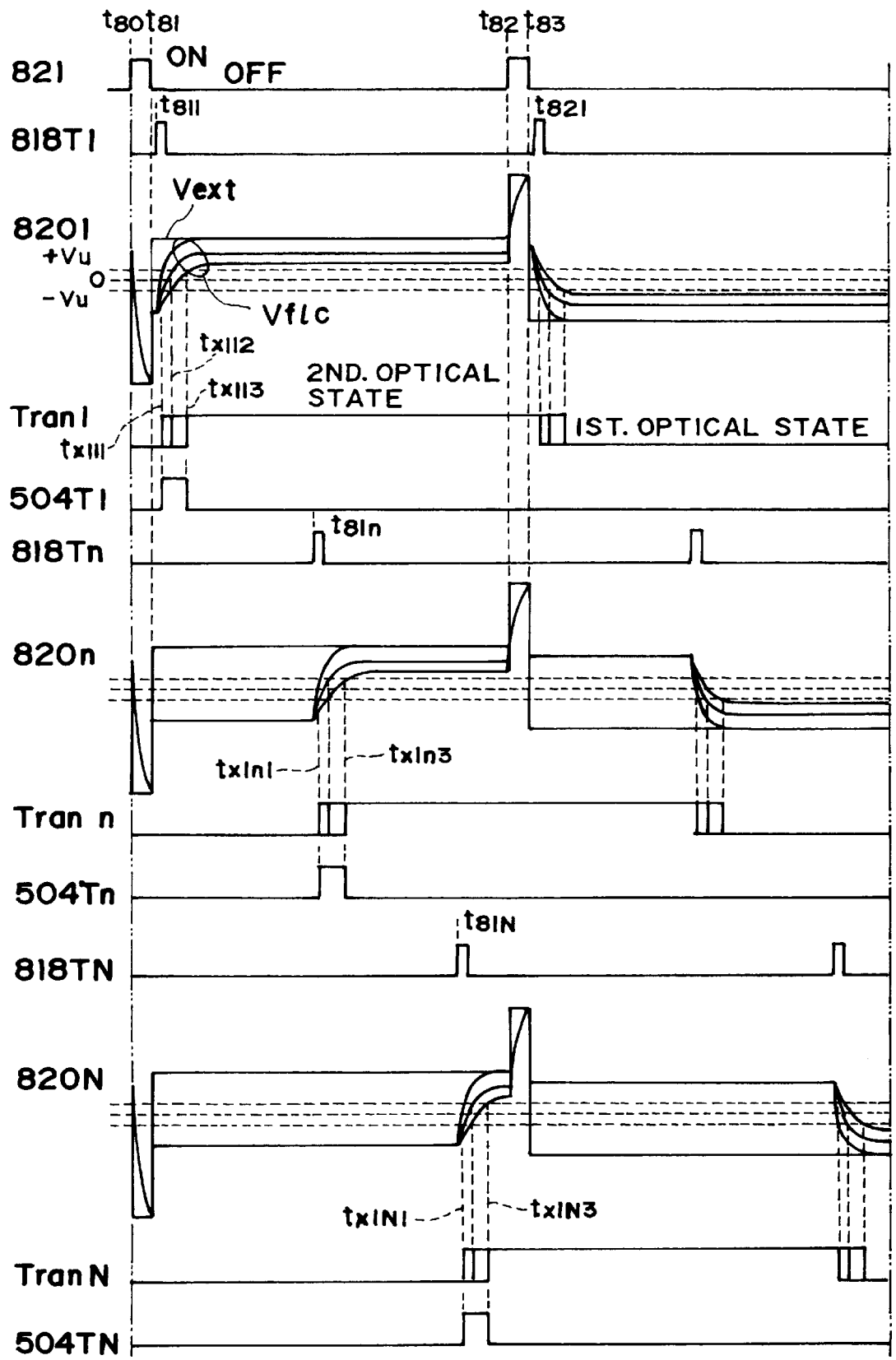
F I G. 29

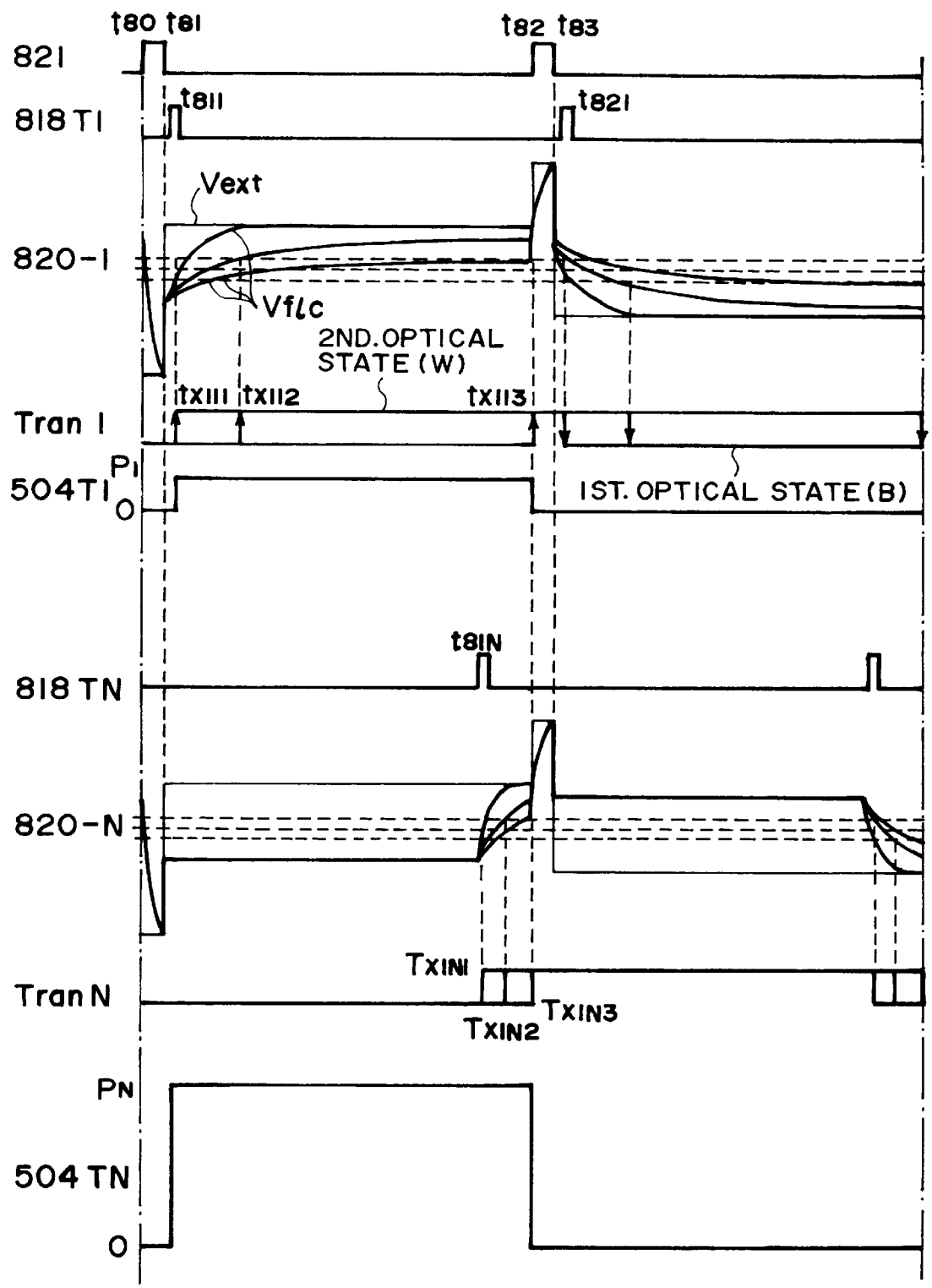
F I G. 31

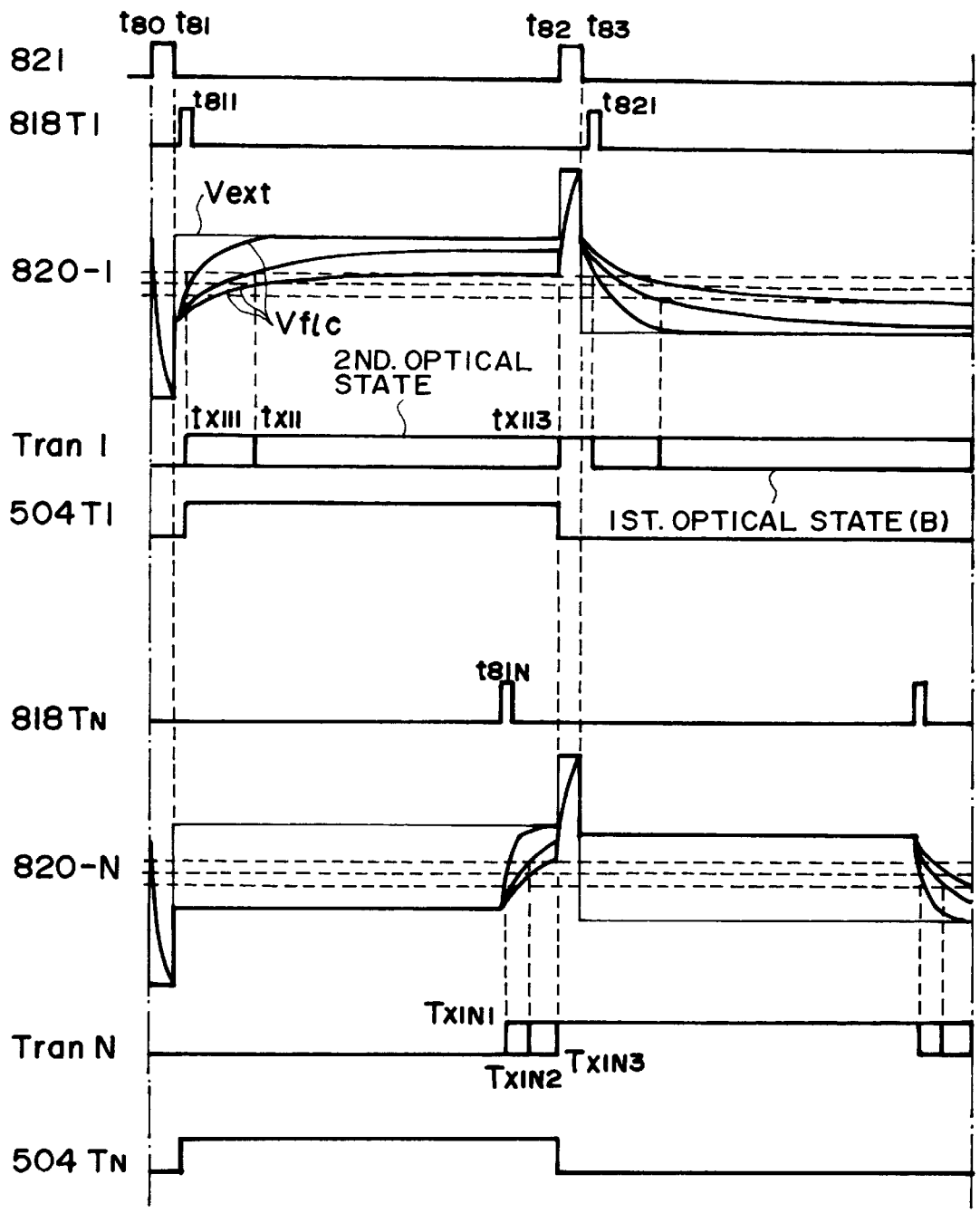
F I G. 36

DRIVING METHOD FOR OPTICAL APPARATUS

FIELD OF THE INVENTION AND RELATED ARTS

The present invention relates to a driving method for an optical apparatus, and particularly to a driving method for an optical apparatus including an optical modulation means for modulating optical states based on signals including gradation data, and a readout light source for supplying readout light for reading picture data to the optical modulation means.

An optical modulation device (optical modulation means) is included in various optical apparatus, such as a display apparatus. Gradational display or gray-scale display is performed by using such an optical modulation device, for example according to various schemes as will be described hereinbelow with reference to a liquid crystal display device as a familiar example.

Accordingly to one scheme, a twisted nematic (TN) liquid crystal is used as an optical modulation element (substance) constituting pixels and voltage data is applied to the TN-liquid crystal to modulate (control) the transmittance through a whole pixel.

According to a second scheme, one pixel is composed as an assemblage of plural sub-pixels so that each sub-pixel is turned on or off based on binary data to modulate the area of sub-pixels placed in a light-transmission state. This scheme is disclosed, e.g., in Japanese Laid-Open Patent Application (JP-A) 56-88193, European Laid-Open Patent Application (EP-A) 453033 and EP-A 361981.

According to a third scheme, one pixel is provided with a distribution of electric field intensity or an inversion threshold of a liquid crystal so that a bright state portion and a dark state portion are co-present in a varying a real ratio to modulate the transmittance through the pixel. This scheme is disclosed in U.S. Pat. No. 4,796,980 issued to Kaneko, et al and entitled "Ferroelectric liquid crystal optical modulation device with regions within pixels to initiate nucleation and inversion", and U.S. Pat. Nos. 4,712,877, 4,747,671, 4,763,994, etc.

According to a fourth scheme, the period of one pixel being turned-on to show a bright state is modulated. This scheme is disclosed in U.S. Pat. No. 4,709,995 issued to Kuribayashi, et al and entitled "Ferroelectric display panel and display method therefor to activate gray scale". Another example of digital duty modulation is disclosed in U.S. Pat. No. 5,311,206 issued to Nelson and entitled "Active row backlight column shutter LCD with one shutter transition per row".

Herein, the first scheme is referred to as brightness modulation; the second scheme, pixel division; the third scheme, domain modulation; and the fourth scheme, digital duty modulation.

The brightness modulation scheme is not readily applicable to a device using an optical modulation substance having a steep transmittance change characteristic or a memory characteristic. Further, the brightness modulation using a TN-liquid crystal is not suitable for a system dealing with data varying at high speeds because the TN-liquid crystal generally has a low response speed.

The pixel division scheme equivalent to a system using a unit pixel comprising an assemblage of pixels, is caused to have a lower spatial frequency, thus being liable to result in a lower resolution. Further, the area of light-interrupting portion is increased to lower the aperture ratio.

The domain modulation scheme requires a pixel of complicated structure for providing a distribution of electric field intensity or an inversion threshold. Further, as the voltage margin for halftone display is narrowed, the performance is liable to be affected by the temperature.

The digital duty modulation scheme requires an ON-OFF time modulation so that the modulation unit time is limited by the clock pulse frequency and the gate-switching time. Accordingly, it is difficult to effect a high-accuracy modulation and the number of displayable gradation levels is limited. Further, this scheme necessarily requires an analog-to-digital (A/D) conversion of analog data so that it cannot be readily applied to a simple optical modulation system.

SUMMARY OF THE INVENTION

In view of the above-mentioned problems, an object of the present invention is to provide an optical modulation or image display system (i.e., method and apparatus) allowing optical modulation based on analog data.

Another object of the present invention is to provide an optical modulation or image display system applicable to an optical modulation device using an optical modulation substance having a steep applied voltage-transmittance (V-T) characteristic.

A further object of the present invention is to provide an optical modulation or image display system capable of realizing a high spatial frequency and a high resolution.

Another object of the present invention is to provide an optical modulation or image display system which allows gradational data reproduction according a relatively simple scheme based on analog duty modulation and is thus inexpensive.

According to the present invention, there is provided a driving method for an optical apparatus including an optical modulation means for modulating an optical state based on a signal carrying gradation data, and a readout light illumination means for illuminating the optical modulation means with readout light for reading out picture data, wherein the readout light illumination means is driven to supply readout light having a planar light intensity distribution providing a constant product of a gradation period and a readout light intensity at each readout site of the optical modulation means.

In the present invention, the readout light is provided with a planar light intensity distribution so as to provide a constant product of a gradation period (time width) and a readout light intensity at each readout site of an optical modulation means so that a luminance or brightness at an identical gradation level is made uniform at any site (pixel) of a display picture area. As a result, the readout light need not be scanned to simplify the readout light illumination optical system and allow a compact and inexpensive display apparatus. Herein, the term "gradation period" refers to a period wherein illumination light (readout light) is turned on and an optical modulation substance is placed in an orientation or optical state determining a gradation level.

According to another aspect of the present invention, there is provided a driving method for an optical apparatus including an optical modulation means comprising a pair of electrodes, and a photoconductor layer and an optical modulation substance layer disposed between the electrodes, a signal light source for supplying light data carrying gradation data to the photoconductor layer, and a readout light illumination means for supplying readout light for reading out picture data to the optical modulation substance layer, the driving method comprising the step of:

scanning the photoconductor layer with the light data, frame by frame, while periodically changing the scanning direction.

In the present invention, the scanning with light data is performed in mutually different scanning directions in successive frames so that a luminance or brightness at an identical gradation level is made uniform at any portion or site (pixel) of a display picture area. As a result, the readout light need not be scanned to simplify the readout light illumination optical system and allow production of a compact and inexpensive display apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram for illustrating a basic organization of a drive apparatus for an optical modulation means applicable in the invention.

FIG. 2 is a graph showing an applied voltage (or pulse width)-dependent transmittance characteristic of an optical modulation element (or substance) used in the invention.

FIG. 4 is a diagram for illustrating an embodiment for generating gradation data used in the invention.

FIG. 5 is a block diagram showing another embodiment of the optical modulation system according to the invention.

FIGS. 6, 7 and 8 are diagrams of an embodiment of the drive circuit for an optical modulation device used in the invention.

FIGS. 12, 14 and 16 are circuit diagrams for an optical modulation apparatus.

FIG. 18 is a schematic sectional view of an optical modulation device for an image display apparatus used in the invention.

FIGS. 19A and 19B are schematic illustrations of two molecular orientations (optical states) of a chiral smectic liquid crystal used in the device of FIG. 18.

FIG. 20 is a graph showing an electrooptical characteristic of the liquid crystal used in the device of FIG. 18.

FIGS. 23–25 are charts for illustrating an operation of a picture display apparatus for reference.

FIG. 26 is an illustration of a manner of scanning with writing light and readout light according to a reference example.

FIG. 27 is an illustration of a display apparatus according a reference example.

FIG. 29 is a time chart for illustrating an operation of the display apparatus according to the reference example.

FIG. 31 is a time chart for an operation of a display apparatus according to an embodiment of the invention.

FIGS. 36 and 37 are time charts for illustrating an operation of a display apparatus according to an embodiment of the invention.

DESCRIPTION OF THE PREFERRED EMBODIMENTS

Some embodiments of the present invention will be described later with reference to FIGS. 30 et seq., but, in advance thereof, some description is provided below regarding a basic system or principle (which per se has been already disclosed in a separate application by the present applicant) for facilitating an understanding of the present invention.

First of all, a basic analog duty modulation scheme will be described with reference to the drawings.

FIG. 1 is a diagram of an example of a system for realizing the modulation scheme according to the present invention. The system includes an optical shutter 1 for controlling light transmission as an optical modulation means, a light source 2 for emitting light, a drive means DR1 for driving the optical shutter, a drive means DR2 for turning on and off the light source, and a control means CONT for controlling the power supply to and the operation time of the two drive means.

FIG. 2 is a graph showing an example of transmittance change characteristic of an optical modulation element (substance) constituting the optical shutter 1. For example, when an applied voltage of a constant pulse width exceeds a threshold Vth, transmittance is caused to abruptly increase to be a constant value above a saturation voltage Vsat. If the optical modulation substance has a memory characteristic, the resultant optical state is retained constant even after removal of the applied voltage.

Figure 3:
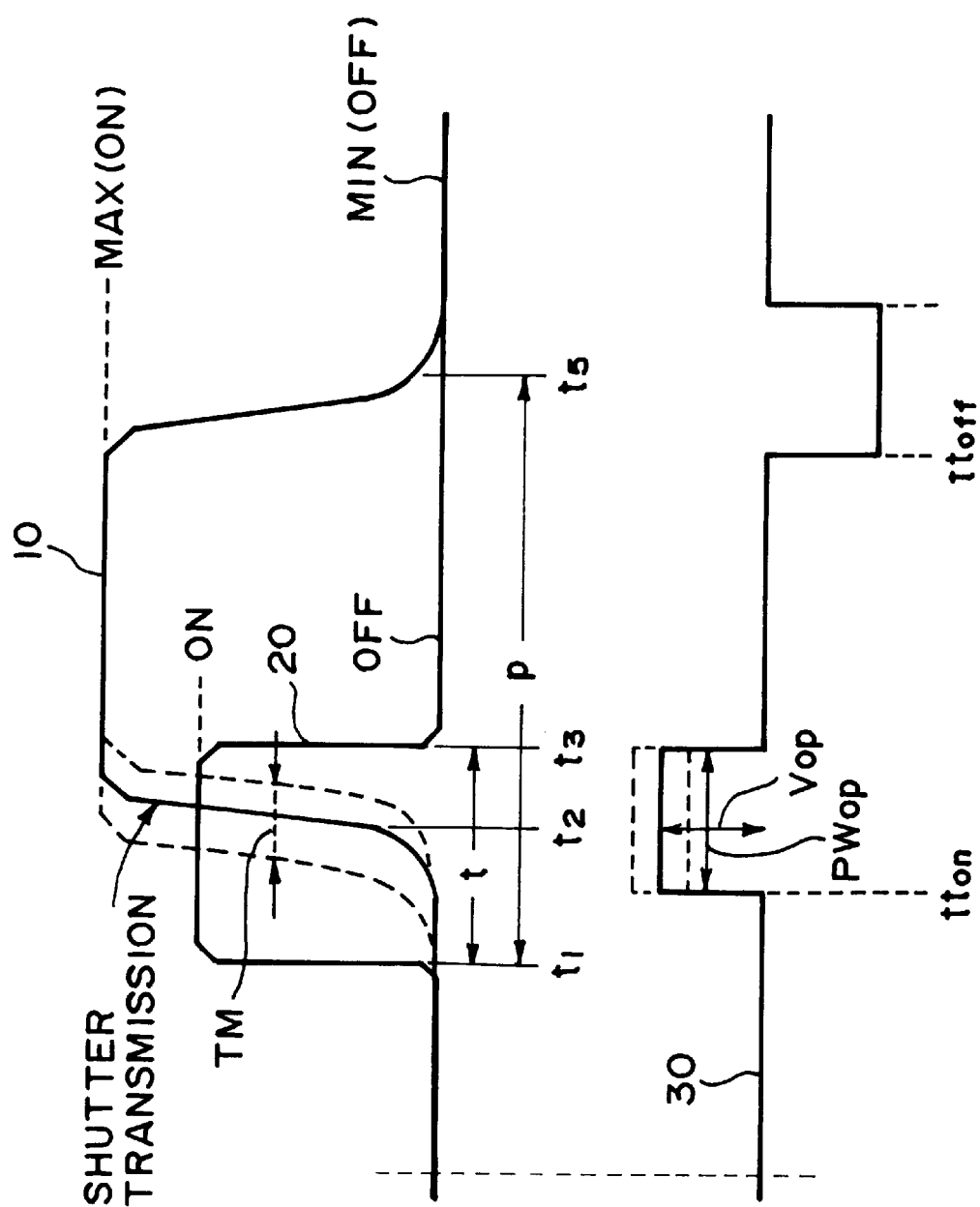
FIG. 3 is a time chart for illustrating a basic embodiment of the driving method for an optical modulation device according to the invention.

FIG. 3 is a time chart for illustrating a basic operation of the system shown in FIG. 1. Referring to FIG. 3, a curve 10 represents an optical transition of the optical shutter 1, a curve 20 represents the operation (lighting and non-lighting) of the light source 2; and a curve 30 represents a signal applied to the optical shutter, whose amplitude (peak value) Vop (and further optionally pulse width PWop) is changed depending on given gradation data.

The light source is turned ON at time $t_1$ and turned OFF at time $t_3$, between which light is emitted from the light source for a period t, which is prescribed for providing a recognizable halftone image. In parallel with a periodical operation (lighting) of the light source, the optical modulation substance is supplied with an applied voltage to switch from a dark state (Min) to a bright state Max when the time integration of the applied voltage exceeds a threshold.

A rise time $t_2$ of the switching depends on the amplitude Vop and pulse width PWop. As the amplitude Vop is modulated depending on gradation data, the time $t_2$ is changed within a time range TM, depending on the gradation data. Time $t_{off}$ is a time for applying a signal for turning off the optical shutter, and the time integration of the light quantity transmitted through the optical shutter 1 is governed by a period of overlapping between the lighting time (period) and a period in which the optical shutter is held in an ON state, so that the overlapping period ($t_2$–$t_3$ in FIG. 3) is changed (modulated) depending on the gradation data. As a result, the time integration of the transmitted light quantity may be easily modulated if the amplitude Vop is changed in an analog manner at a constant pulse width PWop. Herein, the overlapping period is referred to as a gradation period.

In any of the conventional digital duty modulation schemes, the application time $t_{on}$ of a voltage signal 30 is changed in a digital manner at constant pulse width PWop and amplitude PWop of the voltage signal 30.

In contrast, according to this modulation scheme, the signal 30 is treated as an analog quantity having varying amplitude (or/and pulse width) so as to allow an analog duty modulation.

FIG. 4 shows an example of circuit generating an analog signal 30. Given gradation data is amplified by an amplifier comprising a transistor Tr1 and sampled by a switch comprising a transistor Tr2 to provide a signal having a modulated amplitude and a prescribed pulse width required for driving the optical shutter.

Then, another basic modulation scheme will be described with reference to FIG. 5.

The system shown in FIG. 5 is different from the one shown in FIG. 1 in that it includes a light reflection means 1A as an optical modulation means instead of the light transmission means 1 in FIG. 1. The light reflection means may comprise a liquid crystal device or a mirror device. Such a reflective-mode liquid crystal device may be constituted by forming one of a pair of substrates sandwiching a liquid crystal with a transparent member and the other with a reflective member so as to select a light-absorbing state or a light-reflecting state depending on an orientation state (optical state) of the liquid crystal. In the case of a mirror device, the reflection surface angle of the mirror may be controlled by moving the mirror to select a prescribed direction (ON state) suitable for reflection and another direction not causing reflection.

Then, the overlapping time or period between the lighting time of the light source 2 and the ON period of the reflection means 1A (i.e., gradation period) is modulated in an analog manner depending on given gradation data.

Herein, the ON period of the reflection means generally refers to a period in which the light source device is in a light-reflecting state or the mirror device has a reflecting surface directed in a prescribed direction. Alternatively, the ON period may be regarded as referring to a period where the reflection means assumes a non-reflecting state, e.g., a light-interrupting state. In this case, the resultant states are simply inverted.

(Drive Circuit)

Some description will be provided regarding a drive circuit used in the present invention.

FIG. 6 illustrates a drive circuit for an optical modulation means, denoted by $C_{LC}$.

It is first assumed that a voltage sufficient to exceed a threshold of the optical modulation means $C_{LC}$ is applied while changing a resistance $R_{PC}$ corresponding to given gradation data. If the $R_{PC}$ is high, the time at which a voltage applied to $C_{LC}$ exceeds the threshold is delayed. On the other hand, if $R_{PC}$ is low, the time at which the voltage applied to $C_{LC}$ exceeds the threshold comes early. Accordingly, by adjusting the time of threshold exceeding and the point and period of lighting of the light source, the analog duty modulation of transmitted light or reflected light becomes possible.

FIG. 7 shows another drive circuit which is different from the one shown in FIG. 6 only in that the optical modulation means $C_{CL}$ is connected in parallel with a resistance $R_{PC}$ and a capacitance $C_{PC}$. In this case, a sufficient voltage Vd is applied for a prescribed period to place the $C_{CL}$ in the ON state, and then a discharge phenomenon, depending on the time constant of the RC circuit, is utilized. At a higher $R_{PC}$ causing a slower discharge, the time at which the voltage applied to $C_{CL}$ subsides below the threshold is delayed. On the other hand, at a lower $R_{PC}$ causing a faster discharge, the time at which the voltage applied to $C_{CL}$ subsides below the threshold comes earlier. By setting the time within the lighting period of the light source, the light transmission or reflectance period can be modulated in an analog manner depending on a difference in the time.

FIG. 8 shows another drive circuit example wherein gradation data is represented by a variable voltage $V_V$. Different from the one shown in FIG. 7, the time constant of an RC circuit including $R_{PC}$ and $C_{PC}$ is fixed, so that the time at which the voltage applied to $C_{CL}$ subsides below the threshold is determined by the voltage $V_V$ corresponding to gradation data. Accordingly, if the time is adjusted with the lighting period, an analog duty modulation becomes possible similarly as in the example of FIG. 7.

(Light Source)

Some description is provided regarding a light source. Light emitted from the light source may be any of natural sunlight, white light, monochromatic light, such as red, green and blue light, and combinations of these, and may be determined according to appropriate selection. Accordingly, examples of the light source suitably used in the present invention may include laser light sources, fluorescent lamps, a xenon lamp, a halogen lamp, a light-emitting diode, and an electro-luminescence device. These light sources may be turned on and off in a controlled manner in synchronism with drive time of the optical modulation means. Particularly, a continuous lighting time of the light source may desirably be at most a reciprocal (e.g., 1/60 sec.) of a flickering frequency, which provides a flicker noticeable by human eyes. In the case of a color display, it is desired to energize the R, G and B light sources according to different time sequences so as to effect optical modulation of R, G and B according to time division. On the other hand, it is also possible to use a white light source in combination with color filters so as to use different colors of filters in time division to change the light (wavelength region) of the illuminating light. (Optical modulation means)

The optical modulation means used in the present invention may include a light-transmission-type device called an optical shutter (or light valve) and a reflection device as a light reflection means for modulating light reflectance. A representative example thereof may include one called a spatial light modulator (SLM).

The optical shutter used in the present invention may be one capable of providing optically different two states. A preferred example thereof may be a liquid crystal device using a liquid crystal as an optical modulation substance.

A preferred type of liquid crystal device may be one comprising a liquid crystal disposed between a pair of electrodes so that liquid crystal molecules change their orientation states depending on an electric field applied thereto, and the light transmittance therethrough is controlled depending on the orientation state in combination with a polarizing device. Accordingly, optical factors, such as transmittance, reflectance, transmission state and reflection states, of a liquid crystal device are determined in combination with a polarizing device.

More specifically, it is possible to use a liquid crystal cell (or panel) comprising a pair of substrates between which a liquid crystal is sealed up. At least one of the mutually opposing inner surfaces of the substrates may be provided with a transparent electrode and an alignment film.

The substrates may comprise a transparent sheet of glass, plastic, quartz, etc. In the case of constituting a device used as a reflection means, one substrate can be non-light-transmissive. The transparent electrode may preferably comprise a metal oxide conductor, such as tin oxide, indium oxide or ITO (indium tin oxide).

The alignment film may preferably comprise a polymer film subjected to a uniaxial aligning treatment, such as rubbing, or an inorganic film formed by oblique vapor deposition.

The liquid crystal may suitably comprise a nematic liquid crystal operating in a nematic phase or a smectic liquid crystal operating in a smectic phase.

The reflection device used in the present invention may be a device called DMD (digital micromirror device) wherein a reflecting surface of a reflective metal is moved by an electrostatic force caused by an applied voltage so as to change the angle of the reflecting surface to modulate the emission direction of the reflected light, or a liquid crystal device of a reflection type including a liquid crystal cell (or panel) as described above, one surface of which is made reflective and the other surface is transmissive so that light incident thereto is reflected when the liquid crystal is placed in a light-transmissive state.

FIGS. 9A–9D show several transmittance-applied voltage characteristics of optical modulation elements (substances) usable in the present invention. In the case of the DMD, the ordinates may be regarded as representing a light quantity reflected in a prescribed direction.

Figure 9A:
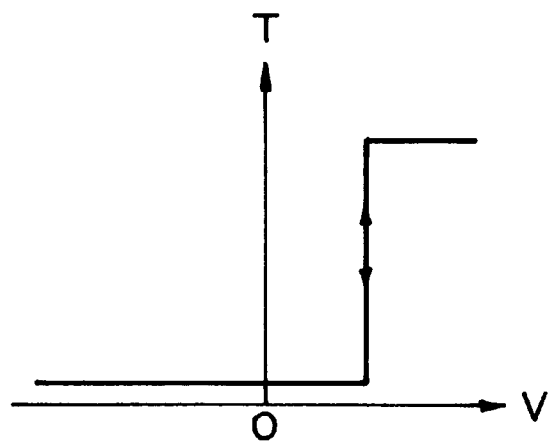
FIGS. 9A–9D are graphs showing a transmittance-applied voltage characteristic of an optical modulation substance (or element) used in the invention.
Figure 9B:
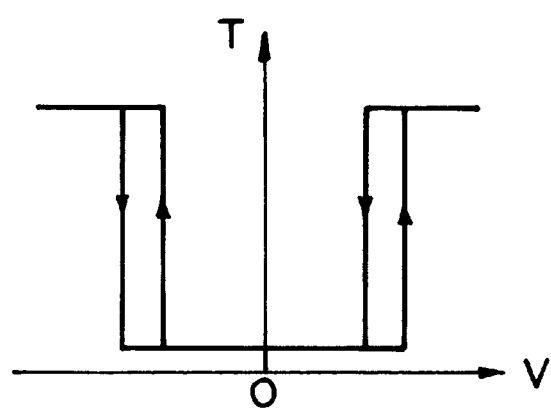
Figure 9C:
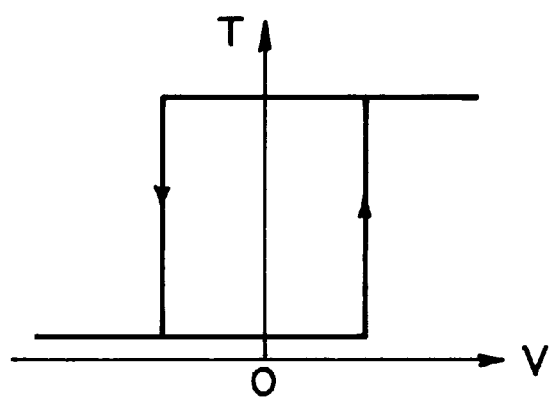
Figure 9D:
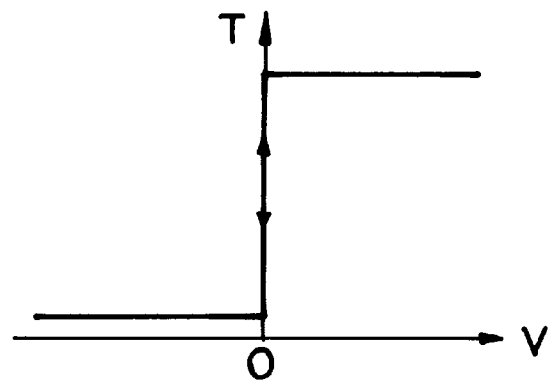

FIG. 9A shows a characteristic of an optical modulation substance causing a transition (switching) of optical states when a positive threshold voltage is exceeded. FIG. 9B shows a characteristic of an optical modulation substance having positive and negative thresholds each accompanied with a hysteresis. FIG. 9C shows a characteristic of an optical modulation substance showing a hysteresis providing positive and negative thresholds. FIG. 9D shows a characteristic exhibiting a threshold at a voltage of zero. FIGS. 9A–9D show characteristics in a somewhat simplified and ideal form, and a vertical line shown in these figures is actually inclined to provide a threshold value and a saturation value on both sides as shown in FIG. 2.

With respect to matching with drive circuits, the characteristic of FIG. 9A or 9B may preferably be combined with a parallel circuit shown in FIG. 7 or 8, and the characteristic of FIG. 9C or 9D may preferably be combined with a series circuit as shown in FIG. 6.

The following Examples 1 to 6 are raised as reference examples for facilitating the understanding of the present invention.

REFERENCE EXAMPLE 1

Figure 10:
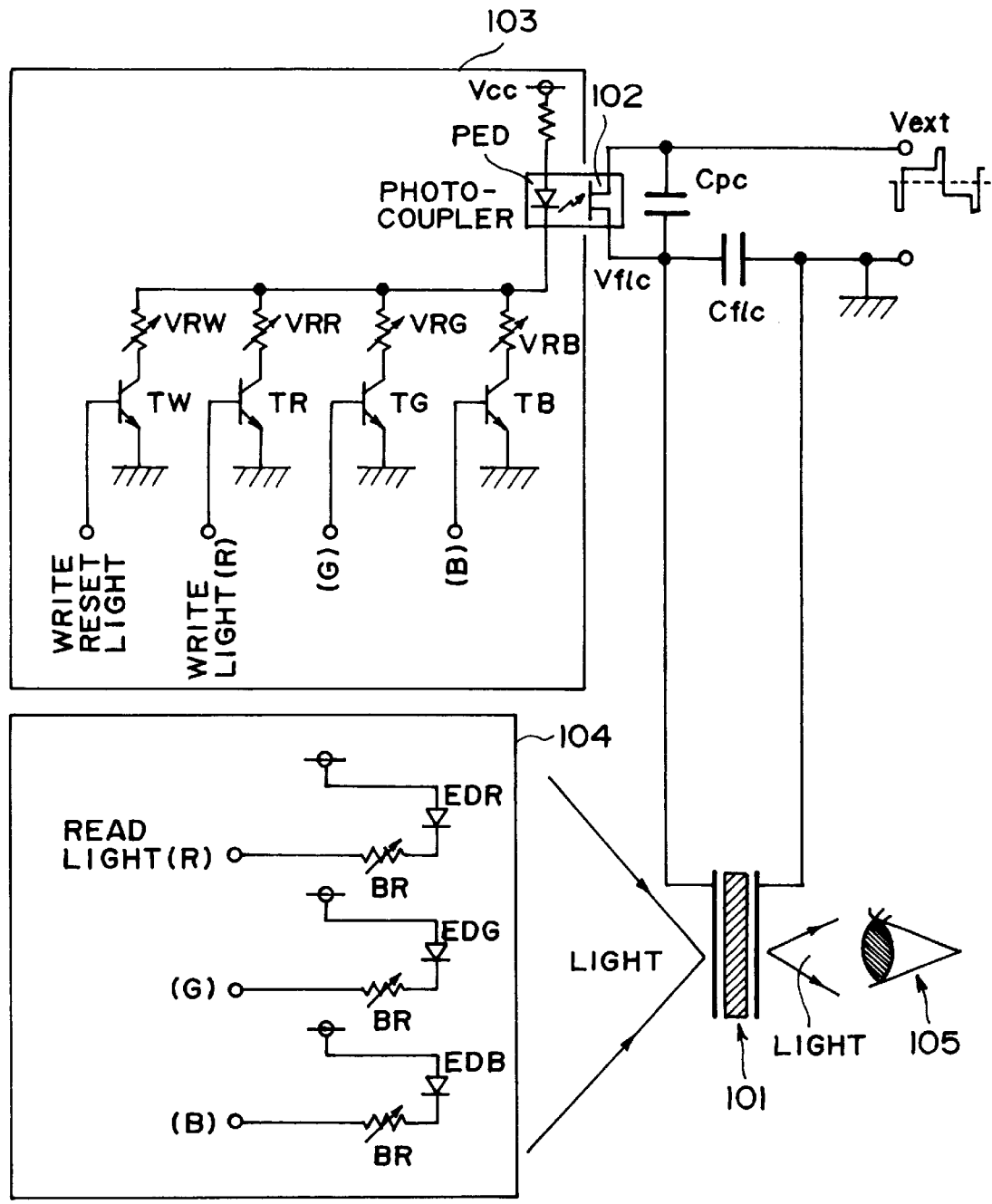
FIG. 10 is a circuit diagram of an optical modulation apparatus.

FIG. 10 illustrates an optical modulation system for driving an optical modulation device. The system includes a liquid crystal device 101 comprising a pair of substrate each having thereon an electrode and a chiral smectic liquid crystal disposed between the substrates, and a gradation data-generating circuit 103 for generating gradation data, and a light source 105. In front of the system, an observer 105 is indicated. The system also includes a drive circuit including a capacitive element $C_{PC}$ and a transistor 102, whose source-drain (or emitter-collector) resistance is changed by changing the gate or base potential of the transistor 102, thereby changing a time point at which the voltage exceeds the inversion threshold of the liquid crystal. The drive circuit includes a voltage application means $V_{ext}$ for applying a reset voltage and drive voltages to the liquid crystal device. $C_{flc}$ represents a capacitance of the liquid crystal.

The gradation data-generating circuit 103 includes a light-emitting diode PED, four variable resistances VRB, VRG, VRR and VRW, four switching transistors TB, TG, TR and TW, and a power supply VCC. The diode PED and the transistor 102 constitute a photocoupler.

Electric signals in the form of variable resistance values, constituting gradation data for respective colors, are converted into light data by the light-emitting diode PED.

The light source 104 includes light-emitting diodes EDR, EDG and EDB for emitting light in three colors of R, G and B, and variable resistances BR optionally used for taking a white balance.

Figure 11:
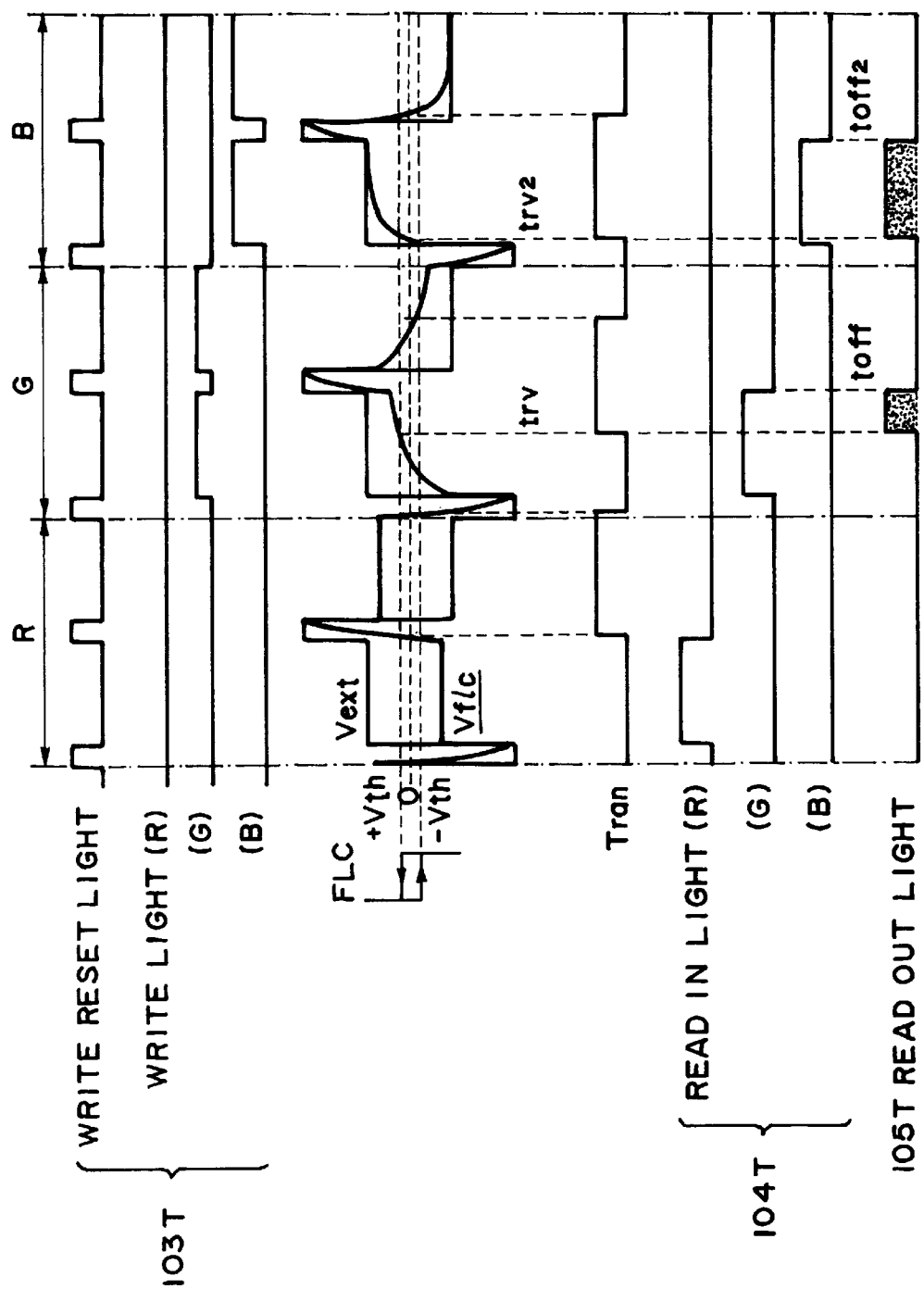
FIG. 11 is a time-serial waveform diagram for illustrating a manner of driving the optical modulation apparatus.

FIG. 11 is a time chart for operation of the system of FIG. 10. At 103T are shown time points for outputting light data. A curve $V_{flc}$ at FLC represents a voltage applied to the liquid crystal and a curve $V_{ext}$ represents a voltage applied from an external voltage supply $V_{ext}$. At $T_{ran}$ is shown a transmittance level through the liquid crystal device. At 104T are shown output levels of light sources. At 105T is a transmitted light quantity level recognized by the observer 105.

Referring to FIG. 11, first, white light for resetting is supplied, and a reset pulse is applied from the voltage application means $V_{ext}$, whereby the liquid crystal is once reset into a dark state.

Then, when light corresponding to R-gradation data is outputted, simultaneously, the R-light emitting diode EDR is turned on and $V_{ext}$ supplies a reverse-polarity voltage to the liquid crystal device. In this period, the R-light quantity from PED is very small, so that the effective voltage applied to the liquid crystal does not exceed the threshold Vth, and the liquid crystal device does not transmit the R-light from EDR.

Then, when white light is supplied again, $V_{ext}$ (a voltage supplied from the means $V_{ext}$) is increased to invert the liquid crystal into a light-transmission state. At this time, however, no light source 104 is energized, so that the observer continually recognizes the dark state.

Then, $V_{ext}$ is changed into a negative voltage but the effective voltage applied to the liquid crystal does not exceed the threshold of −Vth, so that the liquid crystal device remains in the bright state. However, also in this period, no light source is energized.

The R display period is terminated in the above-described manner (in the embodiment of FIG. 11).

Then, an operation in the G-display period is performed similarly as in the R-display period. The G data light quantity is larger than in the case of R described above, so that the voltage applied to the liquid crystal exceeds the threshold Vth at time trv. Then, during a period until time $t_{off}$ when the G light source EDG is turned off, the liquid crystal device transmits the G-light, so that the observer recognizes a medium level of G-light.

Then, an operation in the B-display period is performed similarly as in the R and G display periods. B data light quantity is further larger than in the case of G described above, so that the voltage applied to the liquid crystal exceeds the threshold Vth at time trv2. Then, during a period until time $t_{off}$ when the B light source EDB is turned off, the liquid crystal device transmits the B-light, so that the observer recognizes a medium level but close to a maximum level of B-light.

As described above, in this embodiment, the time (point and period) of $V_{flc}$ exceeding the threshold Vth is changed depending on gradation data. Further, the time of turning off a light source is determined so that the lighting period of the light source does not overlap with the transmission period (ON period) of the liquid crystal device corresponding to gradation data giving a minimum level of transmittance.

As a result, in this embodiment, it is possible to obtain a desired halftone level between a minimum level and a maximum level of brightness. Further, as the voltage applied to the liquid crystal is symmetrically balanced in positive and negative polarities, only a DC component of substantially zero is applied to the liquid crystal to suppress the deterioration of the liquid crystal device.

REFERENCE EXAMPLE 2

FIG. 12 illustrates another embodiment of optical modulation system. The system includes a reflection-type liquid crystal device 201 comprising a pair of substrates each having thereon an electrode and a liquid crystal disposed between the substrates, a light source-drive circuit 204 for driving a light source, a capacitive element $C_{PC}$, a resistive element $R_{PC}$, and a drive voltage supply Vd. In this system, a circuit is constituted so that the resistive element $R_{PC}$ is caused to have varing resistance value, which varies depending on inputted gradation data.

The liquid crystal used may have a transmittance-applied voltage (T-V) characteristic, as shown in FIG. 9A.

Figure 13:
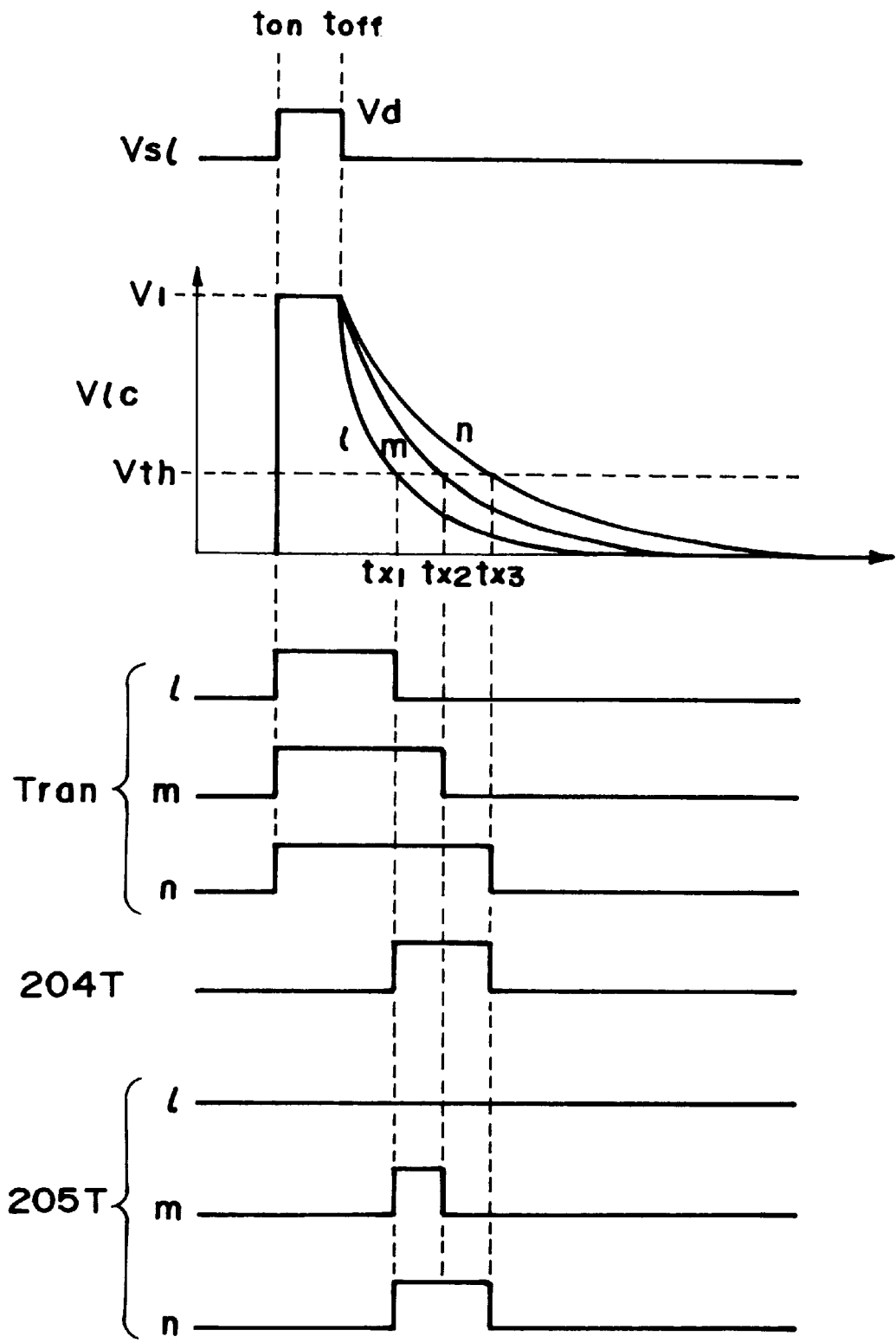
FIGS. 13, 15 and 17 are diagrams showing time-serial waveforms used for driving the optical modulation apparatus of FIGS. 12, 14 and 16, respectively.

FIG. 13 is a time chart for driving the system of FIG. 12. $V_{S1}$ represents the application time of voltage Vd, $V_{lc}$ represents a voltage applied to the liquid crystal, $T_{ran}$ represents a reflectance of the liquid crystal device, 204T represents a lighting time of the light source, and 205T represents reflected light quantities recognized by the observer including a curve 1 given by a low value of $R_{PC}$, a curve m given by a medium value of $R_{PC}$ and a curve n given by a high value of $R_{PC}$, respectively corresponding to levels of analog gradation data.

Referring to FIG. 13, at time $t_{on}$, Vd is applied to the liquid crystal device and the voltage $V_{lc}$ applied to the liquid crystal assumes V1 sufficiently exceeding a threshold Vth, so that the liquid crystal device exhibits a maximum reflectance.

At time $t_{off}$, the voltage Vd is removed, whereby the voltage $V_{lc}$ applied to the liquid crystal is gradually lowered depending on the value of resistance $R_{PC}$ to subside below the threshold Vth at some time which depends on the gradation data, i.e., time $t_{x1}$ for l, $t_{x2}$ for m and $t_{x3}$ for n, when the transmittance $T_{ran}$ respectively assumes the lowest level, respectively. In this embodiment, the light source is designed to be turned on at time $t_{x1}$ and turned off at time $t_{x3}$ as shown at 204T, so that the reflected light quantity 205T assumes the levels as represented by curves l, m and n for the cases of l, m and n, respectively, of $V_{lc}$. By setting the lighting time in this manner, an excellent linearity of halftone display is given.

As described above, in this example, the time of $V_{lc}$ subsiding below the threshold is changed depending on gradation data. Further, the time of turning on a light source is determined so that the lighting period of the light source does not overlap with the reflection period (ON period) of the liquid crystal device corresponding to the gradation data giving a minimum level of reflectance.

As a result, in this example, it is possible to obtain a desired medium reflection state between the minimum brightness level 1 and the maximum brightness level n.

REFERENCE EXAMPLE 3

FIG. 14 illustrates another example of optical modulation system. The system includes a reflection-type liquid crystal device 301 comprising a pair of substrates each having thereon an electrode and a liquid crystal disposed between the substrates, a light source-drive circuit 304 for driving a light source, a capacitive element $C_{PC}$, a resistive element $R_{PC}$, a drive voltage supply Vv and a switch $V_{SO}$ for turning on and off the supply of a voltage signal from the drive voltage supply Vv . In this system, the voltage signal supplied from the drive voltage supply Vv carries analog gradation data.

The liquid crystal used may have a transmittance-applied voltage (T-V) characteristic as shown in FIG. 9A.

Figure 15:
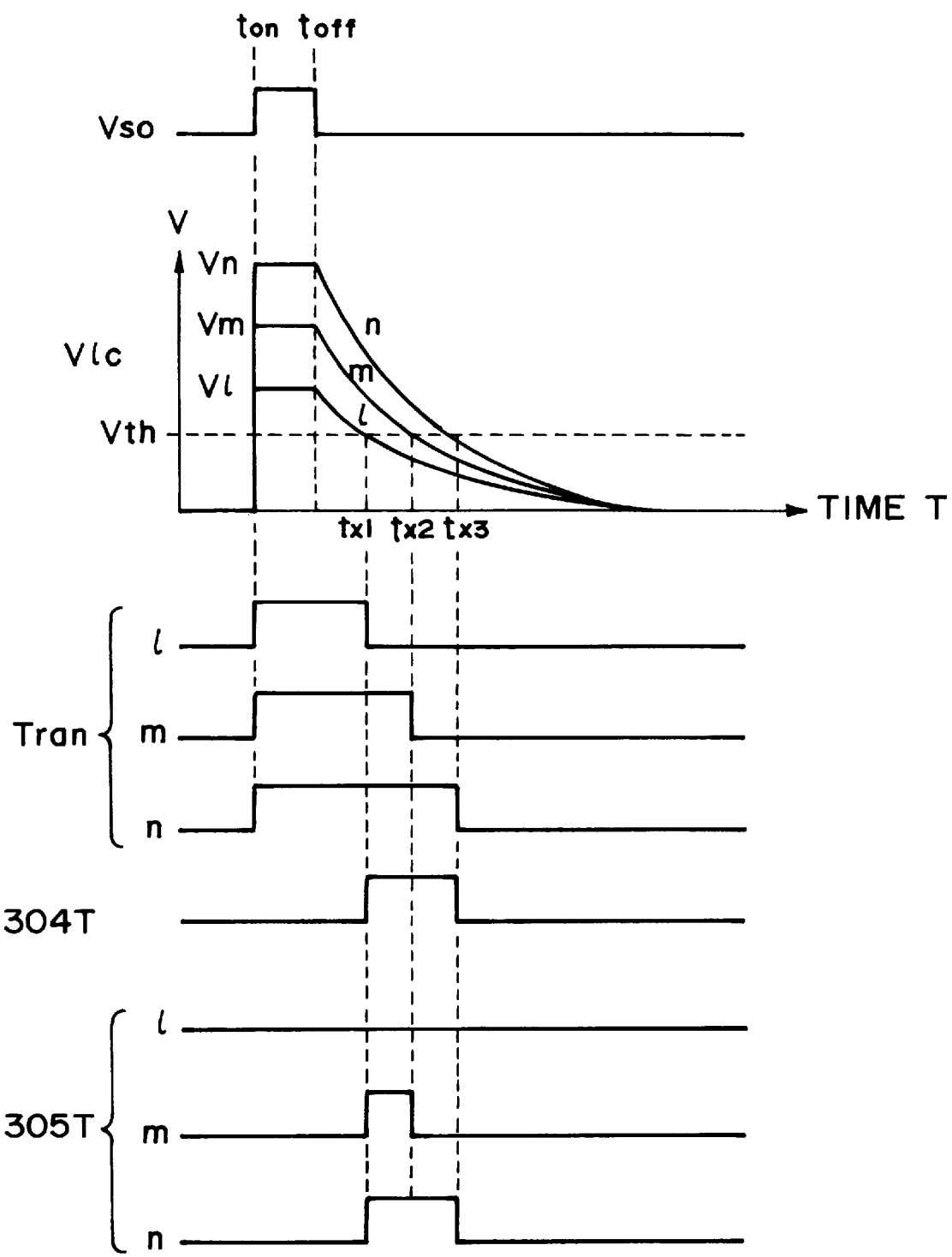

FIG. 15 is a time chart for driving the system of FIG. 14. $V_{SO}$ represents an application time of gradation signal, $V_{lc}$ represents a voltage applied to the liquid crystal, $T_{ran}$ represents a reflectance of the liquid crystal device, 304T represents a lighting time of the light source, and 305T represents reflected light quantities recognized by the observer including a curve l given by a low voltage Vl, a curve m given by a medium voltage Vm, and a curve n given by a high voltage Vn, respectively corresponding to levels of the gradation signals.

Referring to FIG. 15, at time $t_{on}$, Vv is applied to the liquid crystal device and the voltage $V_{lc}$ applied to the liquid crystal assumes voltages Vl, Vm and Vn each sufficiently exceeding a threshold Vth, so that the liquid crystal device exhibits a maximum reflectance in any case.

At time $t_{off}$, the voltage Vv is removed, whereby the voltage $V_{lc}$ applied to the liquid crystal is gradually lowered corresponding to the voltage Vv to subside below the threshold Vth at some time which depends on the gradation data, i.e., time $t_{x1}$ for l, $t_{x2}$ for m and $t_{x3}$ for n, when the transmittance $T_{ran}$ assumes the lowest level, respectively. In this embodiment, the light source is designed to be turned on at time $t_{x1}$ and turned off at time $t_{x3}$ as shown at 304T, so that the reflected light quantity 305T assumes the levels as represented by curves l, m and n for the cases of l, m and n, respectively, of $V_{lc}$.

As described above, in this example, the time of $V_{lc}$ subsiding below the threshold is changed depending on gradation data. Further, the time of turning on a light source is determined so that the lighting period of the light source does not overlap with the reflection period (ON period) of the liquid crystal device corresponding to the gradation data giving a minimum level of reflectance.

As a result, in this example, it is possible to obtain a desired medium reflection state between the minimum brightness level 1 and the maximum brightness level n.

REFERENCE EXAMPLE 4

FIG. 16 illustrates another example of optical modulation system. The system includes a reflection-type liquid crystal device 401 comprising a pair of substrates each having thereon an electrode and an anti-ferroelectric chiral smectic liquid crystal disposed between the substrates, a light source-drive circuit 404 for driving a light source, a capacitive element $C_{PC}$, a resistive element $R_{PC}$, a drive voltage supply Vv, and a switch $V_{SO}$ for turning on and off the supply of a voltage signal from the drive voltage supply Vv. In this system, the voltage signal supplied from the drive voltage supply Vv carries analog gradation data. In front of the liquid crystal device 401, an observer 405 is indicated.

The chiral smectic liquid crystal used may have a transmittance-applied voltage (T-V) characteristic as shown in FIG. 9B.

Figure 17:
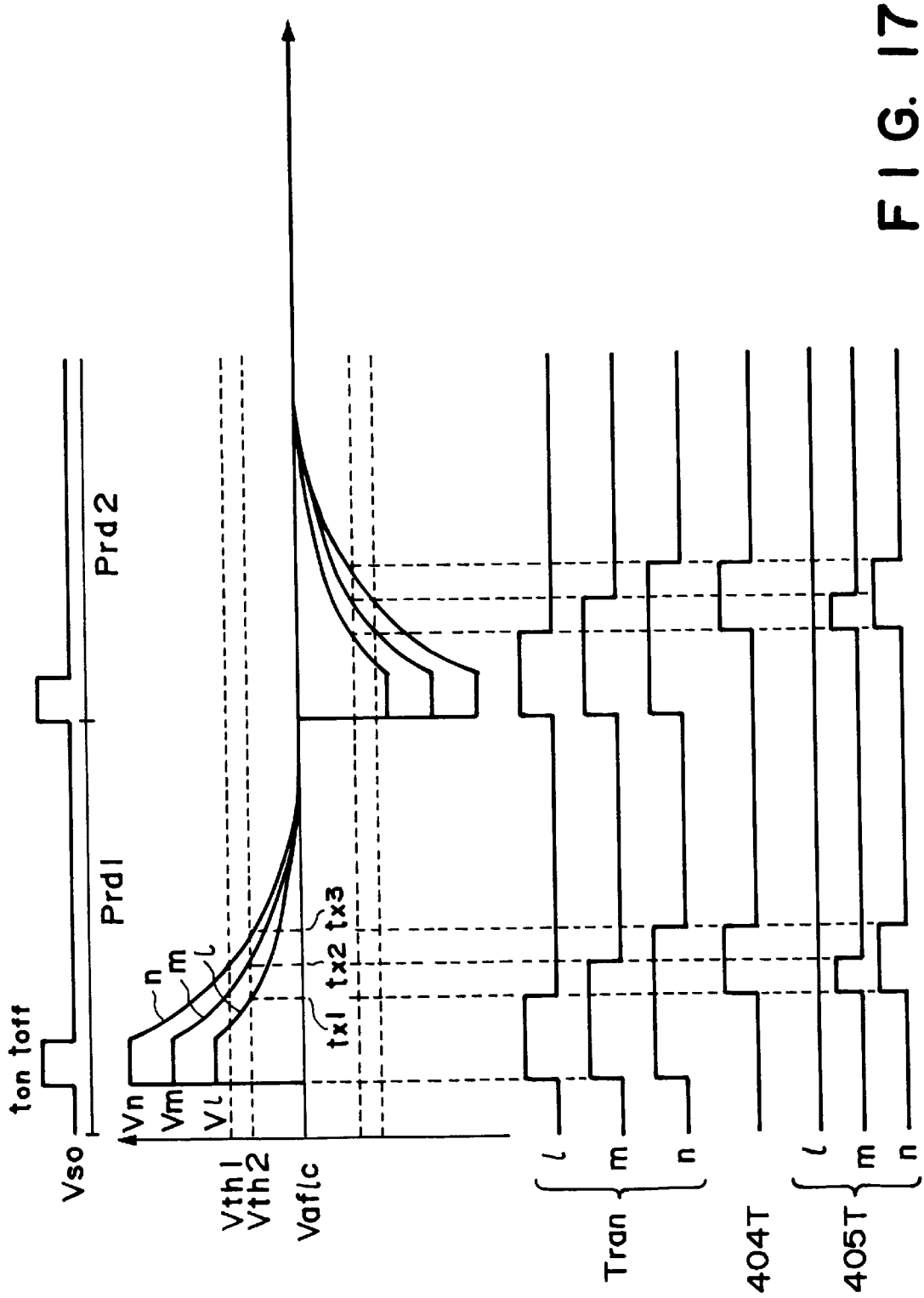

FIG. 17 is a time chart for driving the system of FIG. 16. $V_{SO}$ represents an application time of gradation signal, $V_{aflc}$ represents a voltage applied to the liquid crystal, $T_{ran}$ represents a reflectance of the liquid crystal device, 404T represents a lighting time of the light source, and 405T represents reflected light quantities recognized by the observer including a curve l given by a low voltage of Vl, a curve m given by a medium voltage Vm and a curve n given by a high voltage Vn, respectively corresponding to levels of the gradation signals.

Referring to FIG. 17, at time $t_{on}$, Vd is applied to the liquid crystal device and the voltage $V_{aflc}$ applied to the liquid crystal assumes Vl, Vm or Vn each sufficiently exceeding a threshold Vth, so that the liquid crystal device exhibits a maximum reflectance in case case.

At time $t_{off}$, the voltage Vv is removed, whereby the voltage $V_{aflc}$ applied to the liquid crystal is gradually lowered corresponding to the voltage Vv to subside below the threshold Vth at some time which depends on the gradation data, i.e., time $t_{x1}$ for l, $t_{x2}$ for m and $t_{x3}$ for n, when the transmittance $T_{ran}$ assumes the lowest level, respectively. In this embodiment, the light source is designed to be turned on at time $t_{x1}$ and turned off at time $t_{x3}$ as shown at 404T, so that the reflected light quantity 405T assumes the levels as represented by curves l, m and n for the cases of l, m and n, respectively, of $V_{aflc}$.

This embodiment is different from the embodiment of FIGS. 14 and 15 in that an anti-ferroelectric liquid crystal is used and, corresponding thereto, in a period Prd2, the voltage Vv is inverted from the one used in the preceding period Prd1. The anti-ferroelectric liquid crystal can provide two thresholds due to a hysteresis in opposite polarities but, even if the polarity of the voltage Vv is inverted, the optical state of the liquid crystal is identical as shown at $T_{ran}$. A chiral smectic liquid crystal shows a fast speed of transition between two molecular orientation states (switching speed) and may be a liquid crystal optimally used in the present invention inclusive of the present embodiment.

As described above, in this example, the time of $V_{aflc}$ subsiding below the threshold is changed depending on gradation data. Further, the time of turning on a light source is determined so that the lighting period of the light source does not overlap with the reflection period (ON period) of the liquid crystal device corresponding to the gradation data giving a minimum level of reflectance.

In the present invention, it is possible to use a two-dimensionally extending device in which a large number of optical modulation elements, each functionally equivalent to a light-transmission device (optical shutter) or a light-reflection device as described in the above-mentioned embodiment, are arranged in a two-dimensional matrix. Instead of such a two-dimensional matrix device, it is also possible to use a planar optical modulation device having a two-dimensional extension, each local region (domain) of which functions equivalently as an optical modulation device or element as described above.

More specifically, it is possible to use a panel having a two-dimensional extension along which a multiplicity of transmission-type or light emission-type pixels are arranged and a DMD including a multiplicity of micromirrors arranged in a matrix.

Next, a driving method for an image display apparatus according to the present invention will be described.

REFERENCE EXAMPLE 5

FIG. 18 is a sectional view of an optical modulation device used in an image display apparatus according to a reference example.

Figure 21:
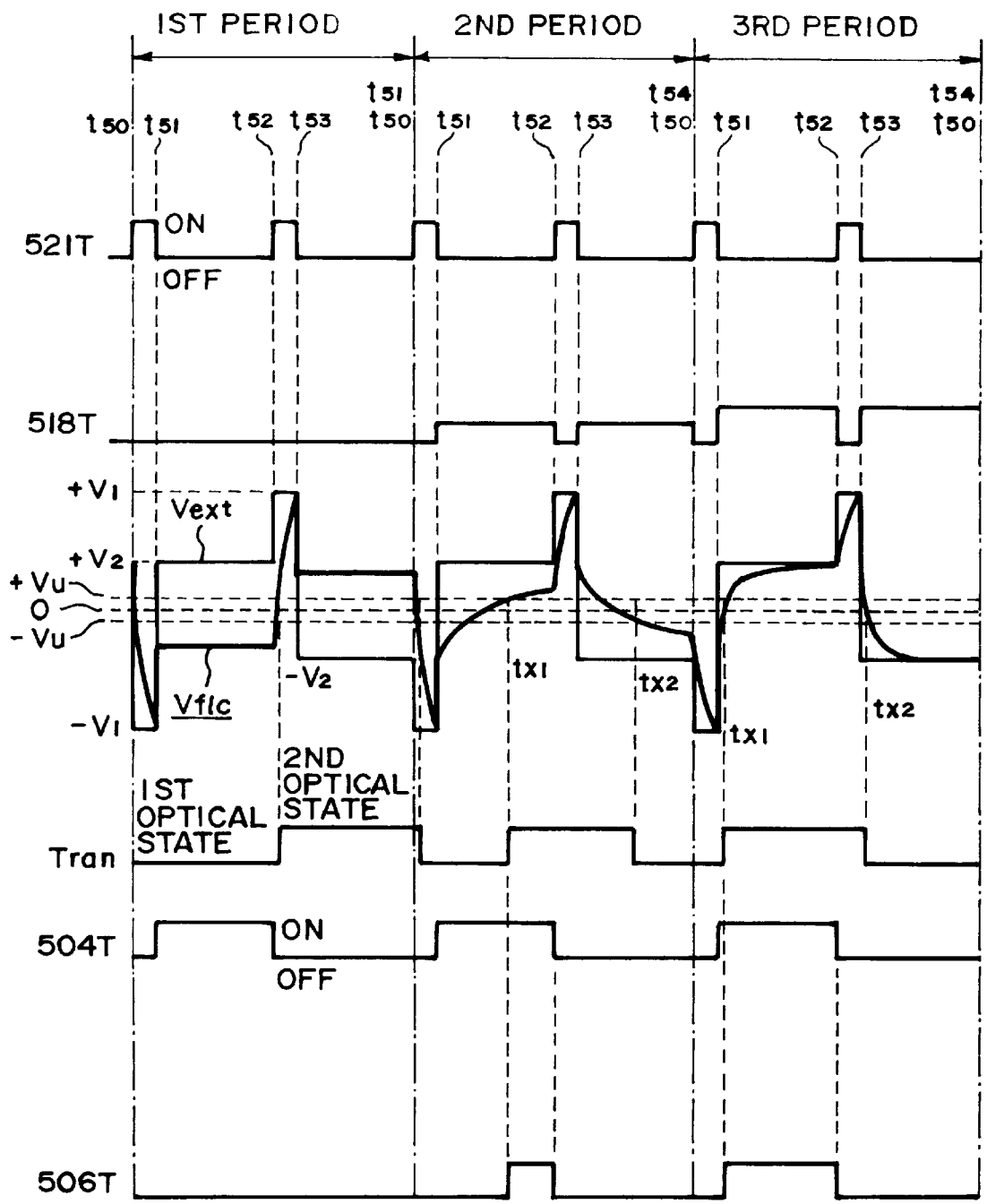
FIG. 21 is a time chart for illustrating an operation of the device of FIG. 18.

FIGS. 19A and 19B schematically show two molecular orientation states (optical states) of a chiral smectic liquid crystal used in the device. FIG. 20 is a graph showing an electrooptical characteristic of the device including the two optical states. FIG. 21 is a time chart for illustrating the basic operation of the device.

The device shown in FIG. 18 constitutes a so-called reflection-type liquid crystal panel. In the device, a transparent substrate 511 is successively provided thereon with a transparent electrode 512, a photoconductor layer 513 as a photosensitive layer, and a dielectric multi-layer film 514 as a reflection layer. The other transparent substrate 516 is provided with a transparent electrode 515. Between the two substrates, a chiral smectic liquid crystal (sometimes abbreviated as "FLC") 517 as an optical modulation substance is disposed. A polarizer 522 is further disposed on the light incidence side. While not shown in the figure, alignment films for aligning liquid crystal molecules are disposed at boundaries of the liquid crystal layer 517 with the electrode 515 and the reflection layer 514. An external voltage application means $V_{ext}$ is connected to the electrodes 512 and 515 so as to apply a voltage between the electrodes. The device thus constituted, is illuminated with reset light 521, writing light 518 carrying gradation data and readout light 519 for reading out the modulated gradation data, i.e., the image.

The device may be represented by an equivalent circuit shown in FIG. 6.

FIG. 19A shows a first orientation state (optical state) of a liquid crystal molecule MOL, and FIG. 19B shows a second orientation state (optical state) of the molecule MOL. When the liquid crystal in the first orientation state (FIG. 19A) is supplied with a voltage +Vu, the liquid crystal is switched to the second orientation state (optical state) (FIG. 19B). The resultant second orientation state (FIG. 19B) is retained even if the voltage is zero, i.e., placed under no electric field. Then, if a reverse polarity voltage -Vu is applied to the liquid crystal, the liquid crystal is switched to the first orientation state (FIG. 19A) which is retained even after removal of the electric field. The switching may also be called a transition or inversion of the liquid crystal. The first and second orientation states shown in FIGS. 19A and 19B are both stable, and the liquid crystal therefore has a memory characteristic.

The states shown in FIGS. 19A and 19B are optically different states (different optical states) so that one may be placed in a maximum transmittance state and the other in a minimum transmittance state by appropriately combining a polarizer. Herein, the voltage value Vu is used for denoting voltage exceeding a saturation voltage, which is assumed to be substantially identical to the inversion threshold voltage.

Now, the operation of the device will be described. For easier comprehension of the operation principle, it is assumed that the capacitance $C_{flc}$ of the liquid crystal layer 517 and the capacitance $C_{PC}$ of the photoconductive layer 513 are identical to each other, the liquid crystal layer 517 has an infinitely large resistance, and the reflection layer 514 has an impedance of zero. Referring to FIG. 21, 521T and 518T respectively represent the illumination time of reset light 521, illuminating the photoconductor layer 513, and the illumination time of the writing light 518, illuminating the photoconductor layer 513 and having an intensity varying depending the gradation data. $V_{ext}$ represents an alternating voltage applied to the transparent electrodes 512 and 515 on both sides of the device, and $V_{flc}$ represents an effective voltage applied by voltage division on both sides of the liquid crystal layer 517. +Vu and −Vu represent voltages for causing the inversion from the first to second state and from the second to first state, respectively, of the liquid crystal as shown in FIG. 20. $T_{ran}$ represents orientation states (first and second) of FLC. In this embodiment, it is assumed that the polarizing device 522, functioning as both a polarizer and an analyzer, is positionally adjusted so that the first orientation state (optical state) provides a dark state of the lowest transmittance and the second orientation state (optical state) provides a bright state of the highest transmittance. 504T represent the lighting time of readout light 519 illuminating the liquid crystal layer 517, and 505T represents a level of output light formed by passing the readout light through the polarizer 522, the liquid crystal 517, the reflection layer 517 and the analyzer 522.

Referring to FIG. 21, in a reset period of from time $t_{50}$ to $t_{51}$, $V_{ext}$ (a voltage level supplied from a voltage supply $V_{ext}$) assumes a voltage $-V_1$ and the photoconductor layer 513 is illuminated with reset light, whereby photocarriers (electron-hole pairs) are generated in the photoconductor layer 513 and the electrons and holes move in opposite directions under an electric field applied by voltage division to the photoconductor layer to be on both sides of the liquid crystal layer 517. As a result of this operation, $V_{flc}$ approaches the potential $-V_1$. As an explanation based on the equivalent circuit of FIG. 6, the voltage change may also be understood as a result of the phenomena that the resistance component in the photoconductor layer is lowered by a photoconductive effect to cause a self-discharge and a potential provided to the photoconductor layer by voltage division is lowered, whereby $V_{flc}$ approaches $-V_1$. When the reset light has a sufficient light intensity, $V_{flc}$ can be reset to $-V_1$ by the time $t_{51}$ regardless of the previous state, so that the first optical state (dark) of the liquid crystal is ensured. At time $t_{51}$, the reset light is turned off, $V_{ext}$ is changed to $+V_2$. At this time, potential $V_{flc}$ is changed by 1:1-capacitance division to $V_3 = -V_1 + (V_2 - (-V_1))/2$. If no writing light is supplied as in the first period of this embodiment, $V_{flc}$ remains at $V_3$ until $t_{52}$, and the liquid crystal remains in the first optical state (dark) as $V_3 < Vu$. Then, in a period after $t_{52}$, an operation similar to the one in the period of $t_{50}-t_{52}$ is performed while changing the polarity of $V_{ext}$. As a result, the integration of $V_{flc}$ in one (cycle) period provides a DC component of 0, so that an AC symmetry of drive waveform required for stable FLC drive is ensured. In a period of $t_{52}$ to $t_{53}$, $V_{flc}$ exceeds Vu to be reset at V1 so that the liquid crystal is inverted into the second optical state (bright).

In a second (cycle) period, the device is illuminated with writing light. The writing light has an intensity smaller than the reset light so that $V_{flc}$ approaches $V_{ext}$ at a slower time constant. In the case where the writing light has a certain large strength or larger, $V_{flc}$ exceeds Vu at time $t_{x1}$ in a period T (of $t_{51}$ to $t_{52}$), when the liquid crystal is inverted from the first optical state to the second optical state. In the case where the writing light is further intense as in a third period, the $T_{x1}$, becomes closer to $t_{51}$ so that the liquid crystal is inverted into the second optical state at an earlier time. In each of the second and third cycle periods, writing light similar to that used in the period of $t_{51}$ to $t_{52}$ is supplied in the period of $t_{53}$ to $t_{54}$ (i.e., $t_{50}$ in a subsequent cycle period), $V_{flc}$ subsides to −Vu at time $t_{x2}$, whereby the liquid crystal is returned to the first optical state (dark). In any of the first-third periods, the AC symmetry of $V_{flc}$ is ensured and, in each period, the liquid crystal assumes the first optical state each, and the second optical state for 50% of the period. As the writing light intensity increases, the second optical state of FLC is phase-shifted to be earlier.

In parallel with the above liquid crystal state change, readout light is supplied in a period of $t_{51}$ to $t_{52}$ in each cycle period, the observers recognize output light only for an overlapping period between a lighting period of the readout light and the second optical state (bright) period of FLC. As a result, no output light is given in the first cycle period but output light flux is increased as the writing light intensity is increased to provide longer overlapping periods, as in the second and third cycle periods. The change in output light flux is recognized by the observer as a change in light intensity if each cycle period is set to be shorter than a period (e.g., 1/60 sec) of a minimum frequency giving a flicker noticeable to human eyes (i.e., a flickering frequency, e.g., 60 Hz).

On the other hand, if readout light is supplied in the period of $t_{53}-t_{54}$ instead of the period of $t_{51}-t_{52}$, the overlapping period is reduced to reduce output light reflux as the writing light intensity is increased. Accordingly, it is possible to effect a negative-positive exchange between the writing light and the readout light. Writing light may have a two-dimensionally planar spreading so that it is possible to form a planar potential distribution depending on the writing light intensity, thereby providing a so-called photo-writing-type spatial light modulation, allowing a two-dimensional photo-writing and readout. As a result, it is possible to form a monochromatic film viewer.

Figure 22:
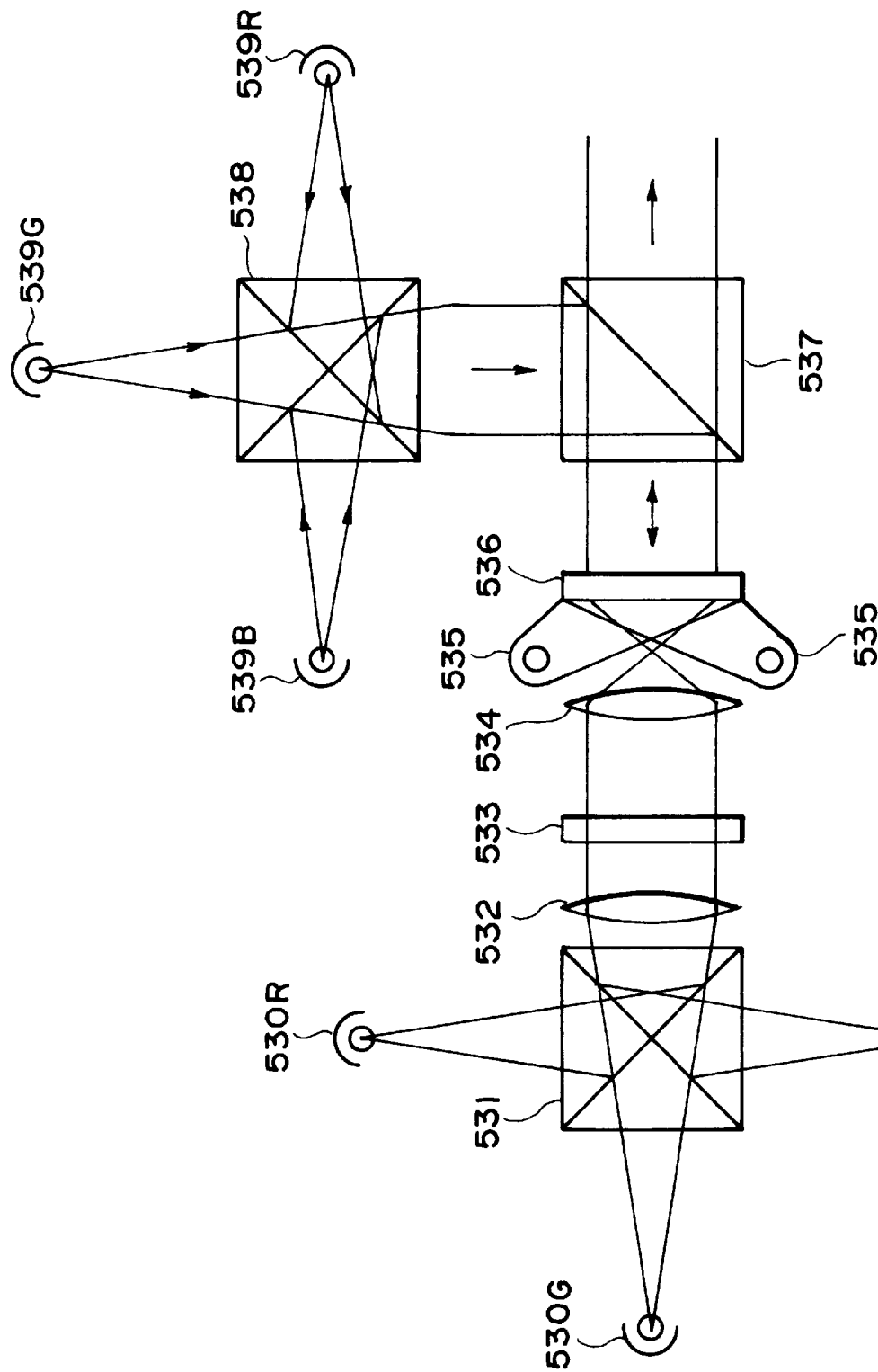
FIG. 22 is a schematic illustration of a picture display apparatus illustrated for reference.

FIG. 22 is a system diagram of a full-color film viewer as an image display device including a photo-writing type spatial light modulator as described above.

The writing-side light source includes light emitting diodes (LEDs) in three colors of R, G and B.

More specifically, referring to FIG. 22, 530R denotes an R-writing light source LED; 530G a denotes G-writing light source LED; 530B a denotes B-writing light source LED; 535 a denotes reset light source; and 531, a three-color mixing prism having an R-reflection surface and a B-reflection surface. The system further includes an optical modulation device, lenses 532 and 534, a film 533, and a prism 537. The system further includes a readout light source system including an R-readout light source LED 539R, a G-readout light source LED 539G, a B-readout light source LED and a three-color mixing prism 538 having an R-reflection surface and a B-reflection surface.

Figure 23:
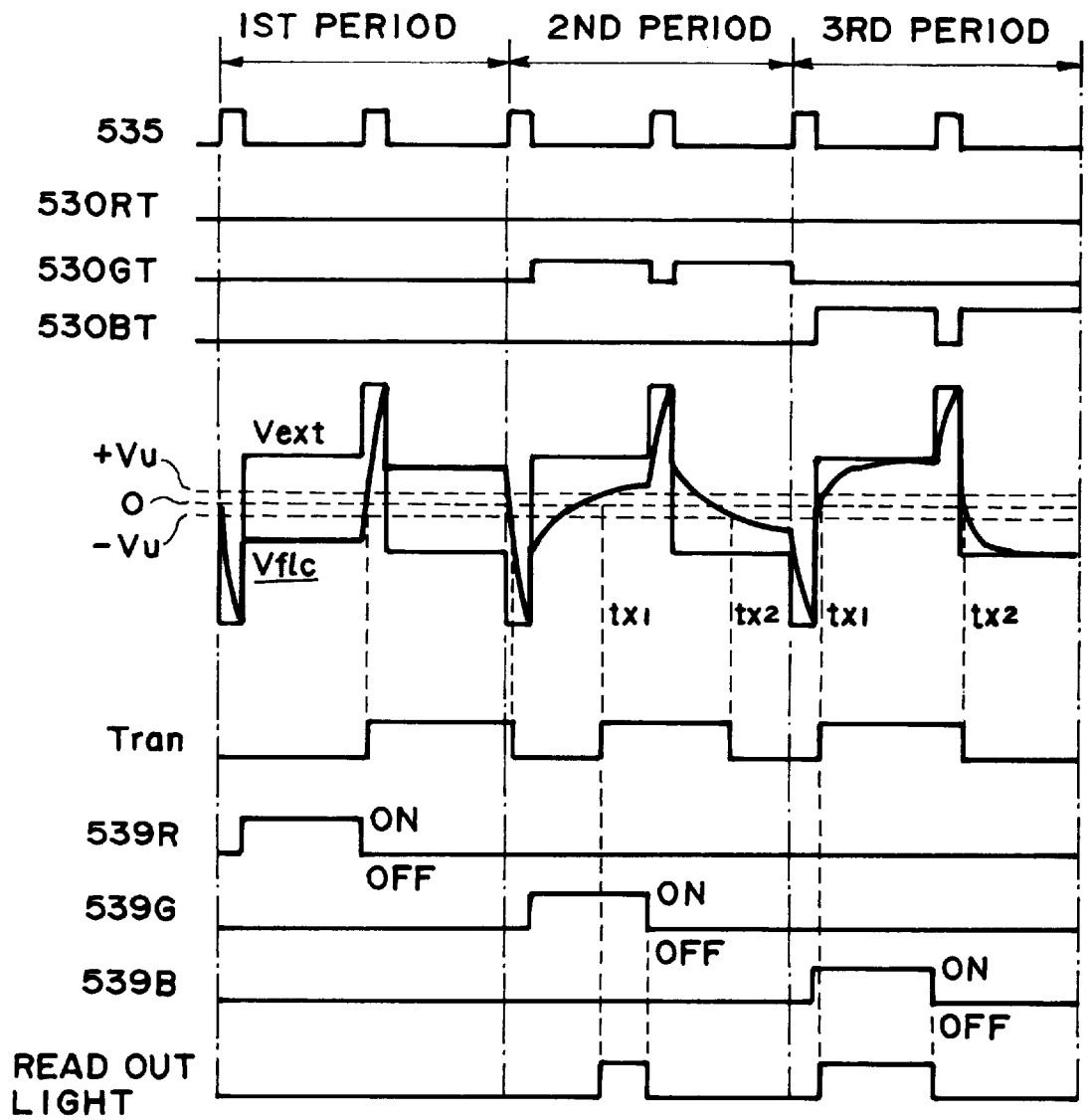

The operation of the system of FIG. 22 will be described with reference to FIG. 23.

Each cycle period is set to be at most ca. 5 msec (=1/flickering frequency/3). The writing light sources 530R, 530G and 530B are sequentially turned on each for one cycle period. On the other hand, the readout light sources 539R, 539G and 539B are sequentially turned on in synchronism with the writing-side light sources. The film 533 carries image data which is assumed to include gradation data represented by transmittances of 0% for R, 50% for G and 100% for B.

During the three cycle periods, additive color mixing is effected to provide a full-color output.

As already described, by changing the lighting time for the readout light sources, the system can be applied to either a positive film or a negative film as the film 533.

If a color filter-equipped, transmission-type liquid crystal TV is used in place of the film 533 and in combination with a combination of a halogen lamp and a color-rotation filter, as a brighter readout light source, the system may provide a motion picture projector.

Incidentally, in the case of constituting a monochromatic OHP (overhead projector) including monochromatic writing, for example, the reset light can be omitted if the writing light quantity for a specific pixel region is not changed.

It is sufficient if the reset light has at least a certain intensity, so that writing can be performed superposedly in the reset period without problem.

Further examples of photo-writing-type film viewer will be described with reference to FIGS. 24 and 25.

The optical system constituting the image display apparatus according to these embodiments is equal to the one shown in FIG. 22, and the optical modulation device is one having a structure as shown in FIG. 18, so that further description thereof will be omitted.

FIG. 24 is a time chart for driving an image display apparatus including the optical modulation device shown in FIG. 18.

The basic operation is identical to the one in the example of FIG. 21 but different in that the writing light 518T is supplied only in a period of $t_{61}$–$t_{62}$, i.e., a former half of a writing period and turned off in a remaining period (i.e., a latter half of the writing period) in each cycle period. Light supplied in a period of $t_{61}$–$t_{62}$ does not contribute to readout. On the other hand, in a period of $t_{62}$–$t_{63}$, i.e., the latter half of the writing period, uniform bias light 550T is supplied. In the case where the writing light 518T carrying gradation data is zero as in a first cycle period, the voltage applied to the liquid crystal is constant at $-V_6$ throughout a period of $t_{61}$–$t_{62}$. Then, when the bias light 550T is supplied at time $t_{62}$, the voltage $V_{flc}$ applied to the liquid crystal is increased in a positive direction due to a lowering in resistance of the photoconductor layer 513. In this example, the value of $R_{PC}$ or $C_{PC}$ (FIG. 6) and time $t_{63}$ are adjusted so that the voltage $V_{flc}$ does not exceed the threshold (+Vu) of the liquid crystal even at the time $t_3$ in the case where the writing light is at the minimum level. Accordingly, as the writing light is 0, i.e., at the minimum level, the output light (505T) is also 0, at the minimum level.

In a period of after $t_{63}$ until $t_{60}$ in a subsequent cycle period, the liquid crystal is subjected to an inversion operation by application of an opposite polarity voltage. In this period, no readout light is supplied, so that no image data is reproduced or outputted.

In a second cycle period in which the writing light is at a medium level, the photoconductor layer 513 is caused to have a lower resistance, and the liquid crystal is supplied with a voltage higher than $-V_6$ in the positive direction.

In a period of $t_{62}$–$t_{63}$ in the second cycle period, the bias light 550T is similarly supplied, the voltage $V_{flc}$ applied to the liquid crystal is increased from the initial voltage higher than $-V_6$ to exceed the threshold (+Vu) of the liquid crystal at time $t_{x1}$ intermediate within a period of $t_{61}$–$t_{63}$ when the readout light is supplied, unlike in the first cycle period. As a result, the liquid crystal shows a maximum transmittance ($T_{ran}$) in a period of $t^{x1}$–$t_{63}$, when the readout light is reflected by the reflection layer 514 of the device. Thus, the period for reflection of the readout light ($t_{x1}$–$t_{63}$) is modulated depending on the writing light quantity (518T). The remaining period after time $t_{63}$ is used for the inversion operation, similarly as in the first cycle period.

In a third cycle period, a maximum level of writing light is supplied (518T). As a result, the voltage $V_{flc}$ applied to the liquid crystal exceeds the threshold +Vu already at the first time point $t_{62}$ when a period of $t_{62}$–$t_{63}$ for bias light supply is started. Accordingly, during the whole period of $t_{62}$–$t_{63}$ wherein the readout light is supplied, the liquid crystal exhibits a maximum transmittance. As a result, the time integration of the reflected light quantity of the readout light, incident on the device and reflected in a prescribed direction, becomes a maximum.

As described above, the readout light reflection time is determined depending on the writing light quantity so that, if the writing light quantity is changed in an analog manner, the reflection time is changed in an analog manner following the writing light quantity change.

In the period of $t_{63}$–$t_{60}$ for inversion operation in each cycle period, the polarity of the applied voltage $V_{ext}$ is inverted and the writing light and the bias light are supplied in identical light quantities as in the writing period. As a result, the time integration of effective voltage applied to the liquid crystal in one cycle period becomes 0, so that the deterioration of the liquid crystal is suppressed.

In this example, the bias light quantity level may be appropriately determined in view of the time constant of the photoconductor layer 513 and the length of the period of $t_{60}$–$t_{63}$. The light source of the bias light may be identical to or different from the one of the reset light. It is, however, preferred that the bias light source and the reset light source are respectively provided with a dimmer means so as to allow independent light quantity control.

In this example, a good halftone display free from flickering may become possible if each cycle period is set to approximately 1/30 sec. or shorter and the period of $t_{60}$–$t_{63}$ is set to approximately 1/60 sec. or shorter.

FIG. 25 is a time chart for driving the image display apparatus including the optical modulation device according to still another example.

The basic operation is identical to the one in the previous example of FIG. 24 but different in that the bias light illumination is replaced by increasing the voltage $V_{ext}$ applied to the device in a period of $t_{72}$–$t_{73}$.

In a period of $t_{70}$–$t_{71}$, reset light is supplied (721T). At this time, $V_{ext}$ is 0.

At time $t_{71}$, $V_{ext}$ is changed to a threshold value +Vu of the liquid crystal but a voltage $V_{flc}$ applied to the liquid crystal becomes a lower voltage +Vuu as the writing light (718T) applied to the photoconductor layer 513 is at a minimum level (=0). In case the where the photoconductor layer 513 and the liquid crystal layer 517 have equal capacities, +Vuu becomes equal to Vu/2.

At time $t_{72}$, the writing light (718T) is made 0, and the voltage $V_{ext}$ applied to the device is gradually increased with time up to +Vem at time $t_{73}$. Correspondingly, the voltage $V_{flc}$ applied to the liquid crystal is increased.

In this instance, if +Vem is set to be twice +Vu, $V_{flc}$ is caused to reach +Vu at time $t_{73}$. As a result, in a period of $t_{72}$–$t_{73}$, the liquid crystal does not cause a switching of optical states, thus not showing a maximum transmittance state, while readout light is kept ON (704T).

The remaining period of $t_{73}$–$t_{70}$ is for the inversion operation, during which image reproduction is not effected as the readout light is not supplied.

In a second cycle period, a medium level writing light illumination operation is performed (718T). As a result of the previous inversion operation, the liquid crystal is placed in a non-light-transmissive state at time $t_{70}$. As $V_{ext}=0$, $V_{flc}$ approaches a voltage level of 0.

At time $t_{71}$, $V_{ext}$ is made equal to the threshold +Vu, and the readout light is turned on (704T). As a result of the application of $V_{ext}$, $V_{flc}$ is increased but does not reach the threshold +Vu.

At time $t_{72}$, $V_{ext}$ begins to increase, so that $V_{flc}$ increases correspondingly to exceed the threshold +Vu at time $t_{x1}$, when the liquid crystal is switched to an optical state showing a maximum transmittance. Accordingly, at this time $t_{72}$, the readout light already turned on is allowed to be incident on the reflection layer 514 through the liquid crystal layer 517 and reflected thereat to provide a recognizable reflected image. Thus, the reflection time $t_{x1}-t_{73}$ is modulated, depending on the writing light quantity.

A period after time $t_{73}$ is for the inversion operation.

In a third cycle period, the writing light is supplied at a maximum light quantity level. The operation in a period of $t_{70}-t_{71}$ is identical to the one in the first and second cycle periods described above.

As a result of illumination with a writing light started at time $t_{71}$, $V_{flc}$ reaches the threshold +Vu at time $t_{72}$. Accordingly, during a readout light lighting period of $t_{72}-t_{73}$, the liquid crystal is held in an optical state of a maximum transmittance, so that the readout light is reflected by the device for a maximum period (705T).

As described above, the readout light reflection time is determined depending on the writing light quantity so that, if the writing light quantity is changed in an analog manner, the reflection time is changed in an analog manner following the writing light quantity change.

In the period of $t_{73}-t_{70}$ for inversion operation in each cycle period, the polarity of the applied voltage $V_{ext}$ is inverted and the writing light and the bias light are supplied in identical light quantities as in the writing period. As a result, the time integration of effective voltage applied to the liquid crystal in one cycle period becomes 0, so that the deterioration of the liquid crystal is suppressed.

In this example, the rate of change of $V_{ext}$ with time may be appropriately determined in view of the time constant of the photoconductor layer 513 and the length of the period of $t_{71}-t_{73}$.

In this example, a good halftone display free from flickering may become possible if each cycle period is set to approximately 1/30 sec. or shorter and the period of $t_{70}-t_{73}$ is set to ca. 1/60 sec. or shorter.

REFERENCE EXAMPLE 6

Now, a further reference example will be described. In the reference examples with reference to FIG. 22, a two-dimensional image carrying gradation data on a film, etc., is written in a photoconductor layer of a liquid crystal device as an optical modulation device by basically a single time of writing light illumination. In this embodiment, a two-dimensional image is written in a liquid crystal device time-serially by vertical and horizontal scanning. The written gradation data may be read out by similarly scanning the liquid crystal device with readout light at an appropriate timing.

FIG. 26 is a schematic plan view of a reflection-type liquid crystal device 801 having a chiral smectic liquid crystal layer and a photoconductor layer structurally identical to the one shown in FIG. 18 for illustration of a scanning scheme. The liquid crystal device is scanned with horizontally scanning writing light 802 while gradually shifting the horizontally scanning light downwards in a non-interlaced manner similarly as in an ordinary scanning operation on a CRT. In other words, the photoconductor layer is time-serially irradiated or illuminated with writing light. On the other hand, readout light 803 is caused to illuminate portions of the liquid crystal layer corresponding to the written positions of the photoconductor layer also for only a prescribed period for reproducing gradation data. Thus, the illumination of the device with readout light is performed also time-serially. The scanning with the readout light 803 is performed after the scanning with the writing light 802.

FIG. 29 is a time chart for more specifically describing the above-explained example. FIG. 29 illustrates an operation in one cycle period while an operation in three cycle periods has been described in the example of FIG. 21.

At 821 is shown an operation of reset light similarly as the one at 521 in FIG. 21. In a period of $t_{80}-t_{81}$, the reset light illuminates the optical modulation device.

Waveforms at 818T1, 8201, $T_{ran}$ 1 and 504T1 are shown to illustrate an operation at a first pixel which is first written by the writing light 802 according to non-interlaced scanning.

At 818T1 is shown the operation time of the writing light 802 incident an the first pixel. At time $t_{811}$ when the first pixel is illuminated with the writing light 802, electron-hole pairs having an electric charge ΔQ proportional to the writing light intensity thereof are generated to cause a potential change ΔV =ΔQ/C. At a stronger writing light intensity, $V_{flc}$ exceeds Vu in a shorter time to cause an optical state change of FLC from a dark to a bright state. In other words, a writing light intensity-FLC phase conversion is performed.

FIG. 29 illustrates three cases, i.e., a case where writing light is imparted at a maximum intensity so as to take out a maximum light quantity, a case where writing light is imparted at a certain offset light intensity so as to provide a dark display state, and a case where writing light is imparted at a medium light intensity so as to take out an intermediate light quantity.

As shown at $T_{ran}$ 1, FLC causes a state change into a second optical state (bright) at time $t_{x111}$ in the case where writing light is imparted at the maximum intensity, and at time $t_{x113}$ in the case where a minimum level of writing light is imparted at a certain offset light intensity.

At 504T1 is shown an operation of readout light incident on the first pixel. When the first pixel is illuminated with the readout light for a period of $t_{x11}$ to $t_{x113}$, an observer can recognize light for a period of overlapping between the readout light illumination time and the second optical state (bright) time of FLC. If the writing in and the readout from the first pixel are repeated in a cycle period shorter than that corresponding to a flickering frequency, the overlapping period change is recognized by the observer as a light intensity change at the first pixel.

Similarly as above, waveforms at 818Tn, 820n, $T_{ran}$ n and 504Tn are shown to illustrate an operation at an n-th pixel, which is placed at a nearly central point in a picture area which is written in by the non-interlaced scanning mode.

Further, waveforms at 8181TN, 820N, $T_{ran}$ N and 504TN are shown to illustrate an operation at an N-th pixel, which is written last with the writing light 802 by the non-interlaced scanning therewith.

The operations of respective pixels are similar to that of the first pixel, whereas the n-th pixel is written at time $t_{81n}$ and the N-th pixel is written at time $t_{81N}$.

FIG. 27 illustrates an image display system according to this Reference Example 6 including a CRT (cathode ray tube) 810 as a writing light source, an image-forming lens 811, a reset light source 812, a mirror 813, a polarization beam splitter 814, a movable mirror 815, a filter 816 for cutting out infrared rays and ultraviolet rays, a readout light source 817, an illumination lens 818, and an image reproduction screen 819.

After being illuminated with reset light, the device 801 is scanned with writing light 802. In synchronism therewith, the device 801 is supplied with a reset voltage and writing voltages sequentially. As a result, the liquid crystal is supplied with an effective voltage, which varies with time, depending on illuminated the light quantity due to light absorption by the photoconductor layer, so that the liquid crystal causes an optical state change at different points of time when the effective voltage exceeds the threshold, thereby providing different periods of time when the liquid crystal is placed in a reflection state depending on given gradation data. In appropriate overlapping with the periods of reflection state, the liquid crystal is scanned with the readout light 803. In this embodiment, the scanning is performed by movement of the movable mirror 815. More specifically, when the movable mirror 815 is moved in arrow AA directions, the readout light 803 illuminating the device 801 moves in arrow AA directions on the liquid crystal device, so that the device 801 is vertically scanned with stripe-form readout light. One horizontal scanning period of the readout light 803 may be set to 1/60 sec or shorter so as to allow the recognition of a halftone. The scanning movements of the movable mirror 815 and the CRT 810 are synchronized with each under by means of a control circuit (not shown).

Figure 28:
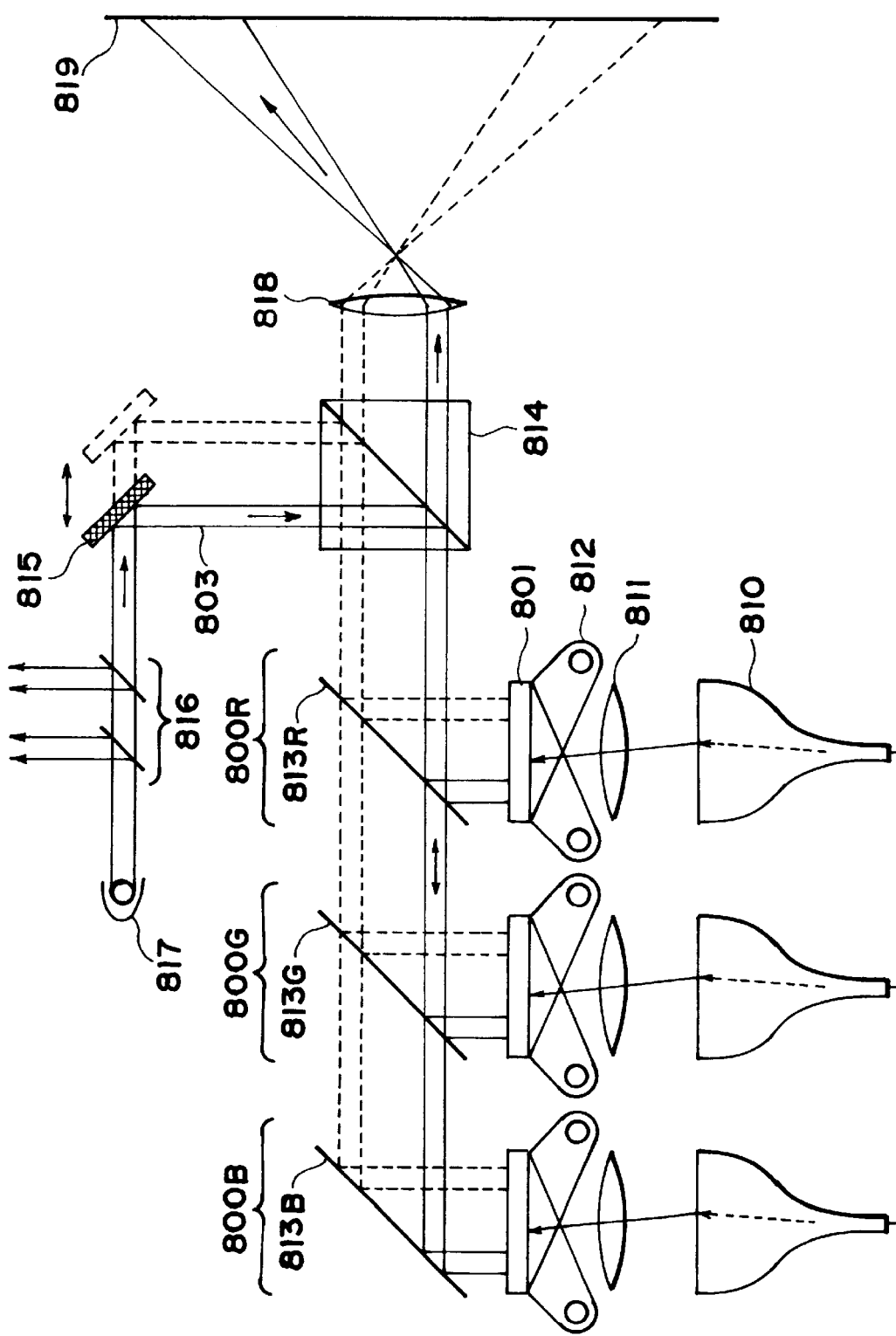
FIG. 28 is an illustration of a display apparatus according to another reference example.

FIG. 28 shows a modification of the above-described Reference Example 6 so as to be applicable to full-color display, so that the writing light scanning means and the liquid crystal device 801 are provided for respective colors therefor, e.g., in three sets 800R, 800G and 800B for three colors of R, G and B, respectively.

The operation of the system shown in FIG. 28 is basically identical to that described with reference to FIG. 29 for the system of FIG. 27. If the writing light scanning timing is synchronized for the three colors, a full color display becomes possible according to additive color mixing. The thus-constituted display apparatus is suited for a full-color motion picture display and is therefore suitably used to constitute a large screen-size television system.

The above-described Reference Example 6 and its modification have been described as using a non-interlaced scanning mode using a spot beam of writing light similar to that used in a CRT, but it is also possible to effect a line-sequential writing scheme by using, e.g., a linear or two-dimensional LED array sequentially turned on and off.

[Embodiments of the Invention]

Following th e above-described reference examples, an embodiment of the present invention will now be described. In this embodiment, similarly as in Reference Example 6, a two-dimensional picture is time-serially written in a liquid crystal device by vertical and horizontal scanning. Then, gradation data is read out by illuminating the device with readout light having a planar intensity distribution. Such light having an planar distribution may be emitted from illumination means, such as a combination of a light source and a correction plate (filter) having a planar light-transmittance distribution, or a two dimensionally arranged light-emission device array.

Figure 30A:
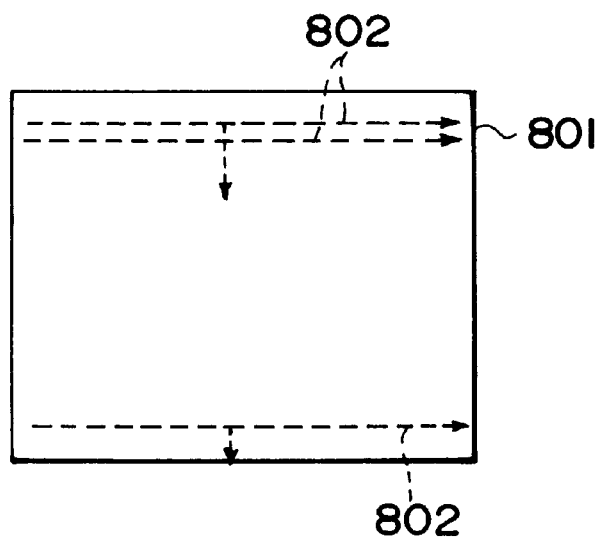
FIGS. 30A and 30B illustrate a scanning scheme according to an embodiment of the invention.
Figure 30B:
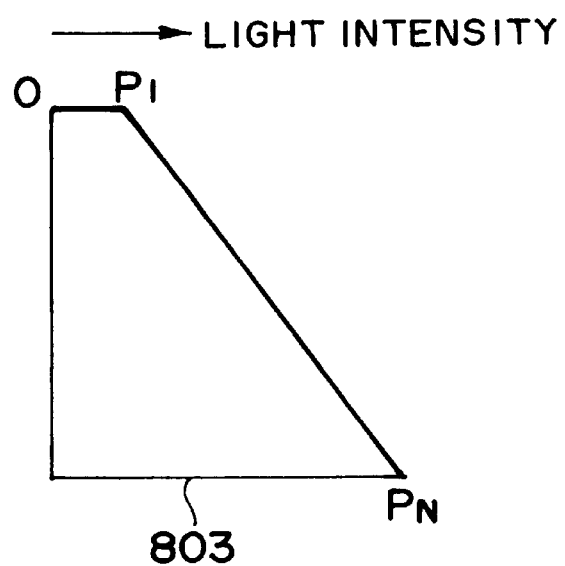

FIG. 30A is a plan view for illuminating a scanning scheme. More specifically, FIG. 30A shows a reflection-type liquid crystal device identical to the one shown in FIG. 18 comprising a layer of a chiral smectic liquid crystal having a memory characteristic, and a photoconductor layer comprising an organic semiconductor and including a charge generation layer and a charge transportation layer. Writing light 802 is used for non-interlaced scanning from the upper to the lower portion as shown, of the device similar to as in scanning on an ordinary CRT. In other words, the illumination of the photoconductor layer of the device with the writing light is performed time-serially. On the other hand, the readout light 803 is emitted with a planar distribution, e.g., as shown in FIG. 30B, so as to compensate for a difference in time modulation width (i.e., gradation period) depending on the sequence of writing with the readout light 803.

FIG. 31 is a time chart for illustrating the operation of the embodiment in further detail. FIG. 31 illustrates an operation in one cycle period while an operation in three cycle periods has been described in the example of FIG. 21.

At 821 is shown an operation of reset light similar to the one at 521 in FIG. 21. In a period of $t_{80}$–$t_{81}$, the reset light illuminates the optical modulation device.

Waveforms at 818T1, 8201, $T_{ran}$ 1 and 504T1 are shown to illustrate an operation at a first pixel, which is first written by the writing light 802 according to non-interlaced scanning.

At 818T1 is shown the operation time of the writing light 802 incident on the first pixel. At time $t_{811}$ when the first pixel is illuminated with the writing light 802, electron-hole pairs having an electric charge ΔQ proportional to the writing light intensity thereof are generated to cause a potential change ΔV=ΔQ/C. At a stronger writing light intensity, $V_{flc}$ exceeds Vu in a shorter time to cause an optical state change of FLC from a dark to a bright state. In other words, a writing light intensity-FLC phase conversion is performed.

FIG. 31 illustrates three cases, i.e., a case where writing light is imparted at a maximum intensity so as to take out a maximum light quantity, a case where writing light is imparted at a certain offset light intensity so as to provide a dark display state, and a case where writing light is imparted at a medium light intensity so as to take out an intermediate light quantity.

As shown at $T_{ran}$ 1, FLC causes a state change into a second optical state (bright) at time $t_{x111}$ in the case where writing light is imparted at the maximum intensity, and at time $t_{x113}$ in the case where a minimum level of writing light is imparted at a certain offset light intensity.

At 504T1 is shown an operation of the readout of light incident to the first pixel. When the first pixel is illuminated with the readout light for a period of $t_{x11}$ to $t_{x113}$, an observer can recognize light for a period of overlapping (i.e., gradation period) between the readout-light-illumination time and the second-optical-state (bright) time of FLC. If the writing in and the readout from the first pixel are repeated in a cycle period shorter than that corresponding to a flickering frequency (ca. 30 Hz), the overlapping period change is recognized by the observer as a light intensity change at the first pixel.

Further, waveforms at 8181TN, 820N, $T_{ran}$ N and 504TN are shown to illustrate an operation at an N-th pixel which is written last with the writing light 802 by the non-interlaced scanning therewith.

The operations of the respective pixels are similar to that of the first pixel, whereas the N-th pixel is written at time $t_{81N}$. The phase conversion in the N-th pixel is intended to be performed in a shorter time, so that a stronger offset light for giving a black state is supplied than to the first pixel. A gradation period (time width) of $T_{X1N3}-T_{X1N1}$ is available for the N-th pixel compared with a gradation time width of $T_{X113}-T_{X111}$ for the first pixel. In order to compensate for the difference, the readout light intensities Pn and $P_N$ (1<n<N) are set to satisfy $P_1(T_{X113}-T_{X111})$=approximately $Pn(T_{X1n3}-T_{X1n1})$=approximately $P_n(T_{X1N3}-T_{X1N1})$.

Figure 32:
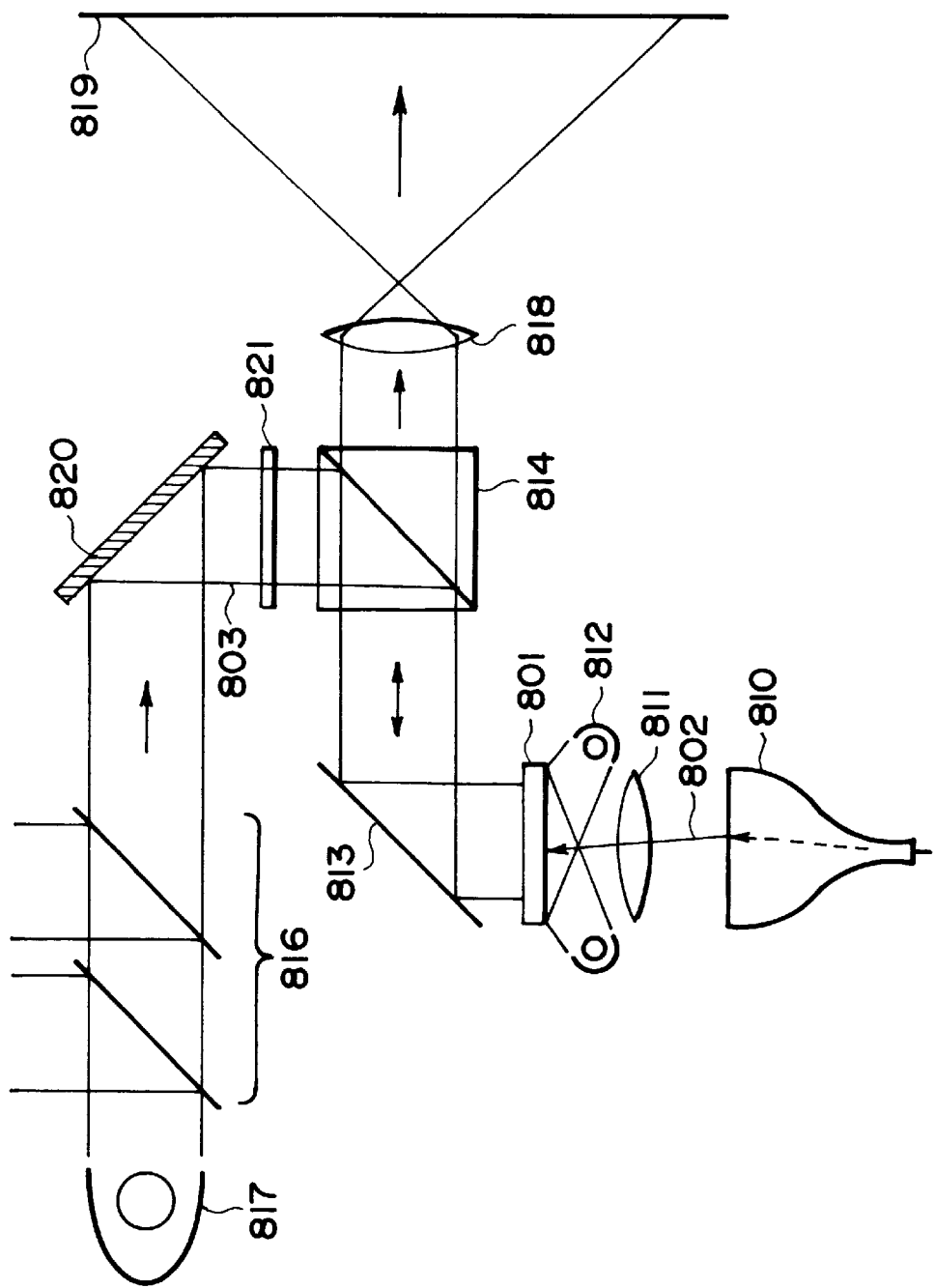
FIGS. 32 and 34 illustrate a display apparatus according to an embodiment of the invention.

FIG. 32 illustrates an image or picture display system according to this embodiment including a CRT (cathode ray tube) 810 as a writing light source, an image forming lens 811, a reset light source 812, a mirror 813, a polarization beam splitter 814, a filter 816 for cutting out infrared rays and ultraviolet rays, a readout light source 817, an image reproduction screen 819, a mirror 820, and a shading correction correction plate (filter) 821.

Figure 33A:
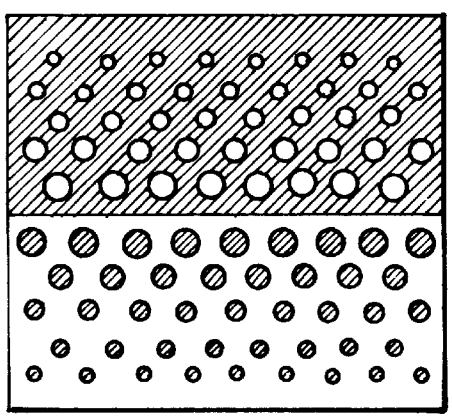
FIGS. 33A and 33B illustrate a planar structure and a transmittance characteristic, respectively, of a shading correction filter.
Figure 33B:
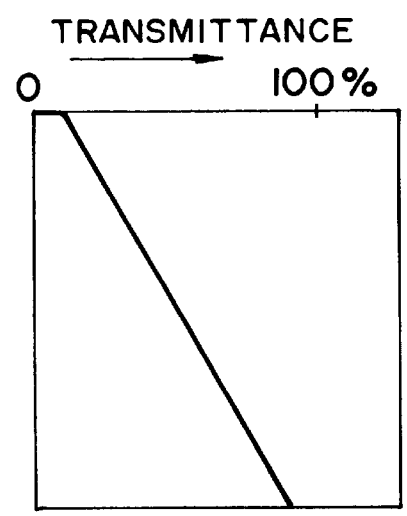

The shading correction correction plate (filter) 821 has a transmittance distribution as shown in FIG. 33B so as to provide a local light intensity Pn as described above in connection with the scanning direction of the writing light. FIG. 33A is a schematic plan view of such a correction plate (filter) providing such a transmittance distribution. The difference in luminance in the horizontal direction is ignorable so that the transmittance in a horizontal direction is made uniform in this embodiment. Such a shading correction plate (filter) may be easily formed, e.g., by application of a pigment of, e.g., white or black, or vapor deposition of a metal pattern, so as to form a light-transmitting or masking pattern providing a transmittance distribution, e.g., as shown in FIG. 33B. The light source may be one having substantially no planar distribution, or it is possible to produce light having no planar distribution by using a diffusion plate.

After being illuminated with reset light, the device 801 is scanned with writing light 802. In synchronism therewith, the device 801 is supplied with a reset voltage and writing voltages sequentially. As a result, the liquid crystal is supplied with an effective voltage which varies with time depending on illuminated light quantity due to light absorption by the photoconductor layer, so that the liquid crystal causes an optical state change at different points of time when the effective voltage exceeds the threshold, thereby providing different periods of time when the liquid crystal is placed in a reflection state depending on given gradation data.

Figure 34:
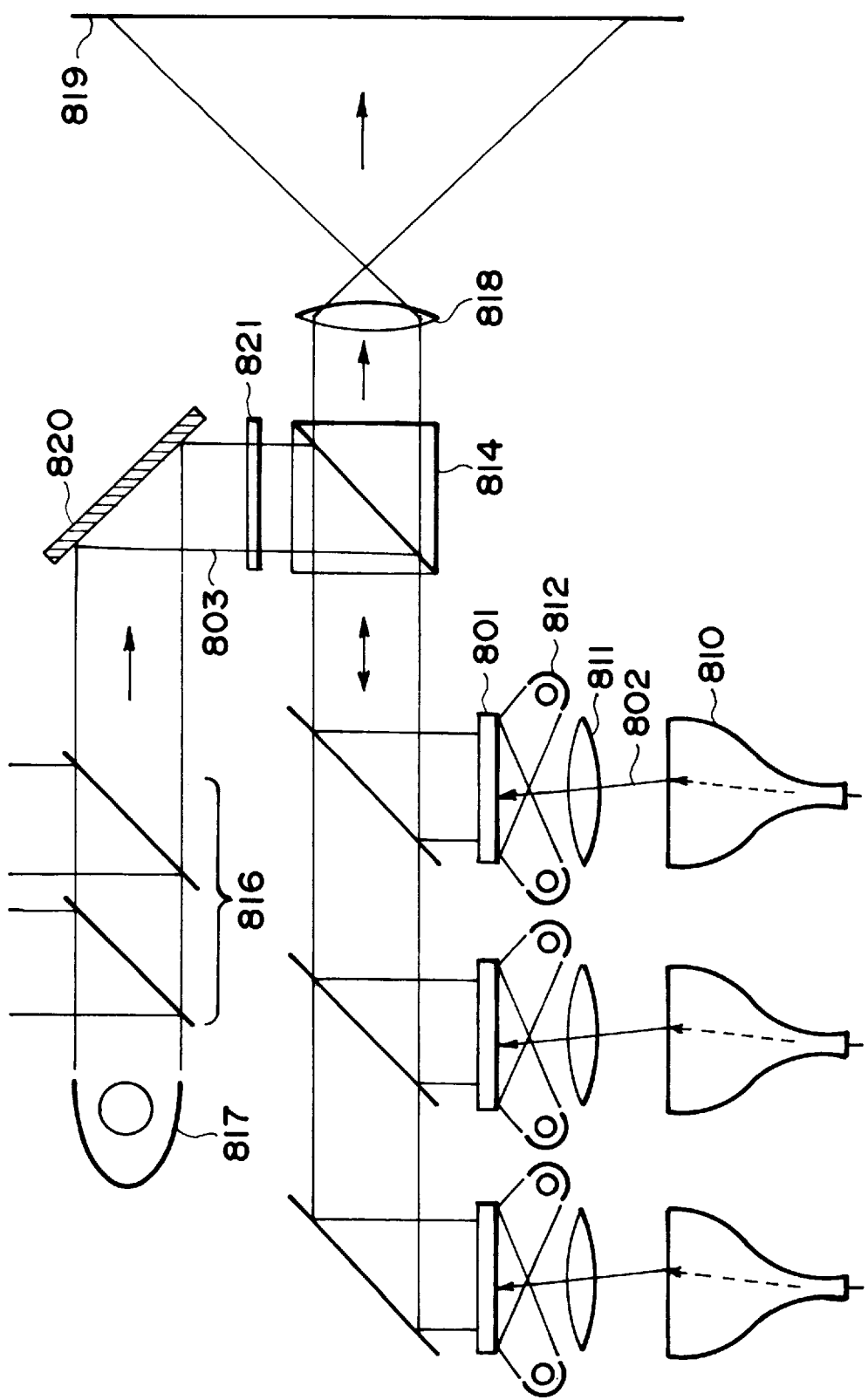

FIG. 34 shows a modification of the above-described embodiment shown in FIG. 32 so as to be applicable to full-color display, so that the writing light scanning means and the liquid crystal device 801 are provided for respective colors therefor, e.g., in three sets 800R, 800G and 800B for three colors of R, G and B, respectively.

The operation of the system shown in FIG. 34 is basically identical to that described with reference to FIG. 31 for the system of FIG. 32. If the writing light scanning timing is synchronized for the three colors, a full color display becomes possible according to additive color mixing. The thus-constituted display apparatus is suited for a full-color motion picture display and is therefore suitably used to constitute a large screen-size television system. The above-described embodiments have been described as using a non-interlaced scanning mode using a spot beam of writing light similarly as in a CRT, but it is also possible to effect a line-sequential writing scheme by using, e.g., a linear or two-dimensional LED array sequentially turned on and off.

In the analog duty modulation system according to the present invention, the signal applied to the optical modulation means is given as a time when the threshold for changing the optical modulation means is exceeded, and is modulated in an analog manner depending on given gradation data. As a result, the period of overlapping of the ON-time of the optical modulation means, such as a period of opening of a shutter or a period of a mirror being positioned in a prescribed direction, and the lighting period of a light source (i.e., gradation period), are modulated, whereby the time-integration of the transmitted or reflected light quantity corresponds to the given gradation data. Accordingly, the number of reproducible gradation levels is not restricted by a digital quantity such as a clock pulse frequency, and the A/D conversion of gradation data becomes unnecessary. Further, even a digital (or binary) display device having a steep applied voltage-transmittance characteristic is applicable to analog modulation, which cannot be expected heretofore.

As described above, according to the above-described described embodiment, good gradational display can be effected. Further, according to the above embodiment, the gradation period (or active period or ON-period) and the readout light intensity are designed to provide a constant product for each readout site of the optical modulation means, whereby the luminance or brightness at an identical gradation level becomes uniform at any site (or portion or pixel) on the display picture area. As a result, the scanning with readout light becomes unnecessary so that the organization of the readout optical system is simplified to provide a compact and inexpensive display apparatus.

Now, another embodiment of the present invention will be described. In this embodiment, similarly as in Reference Example 6, a two dimensional picture is written in a liquid crystal device by vertical and horizontal scanning frame by frame, while the order of two-dimensional writing (particularly, the vertical scanning direction) is exchanged between succeeding frame writing operations.

Figure 35A:
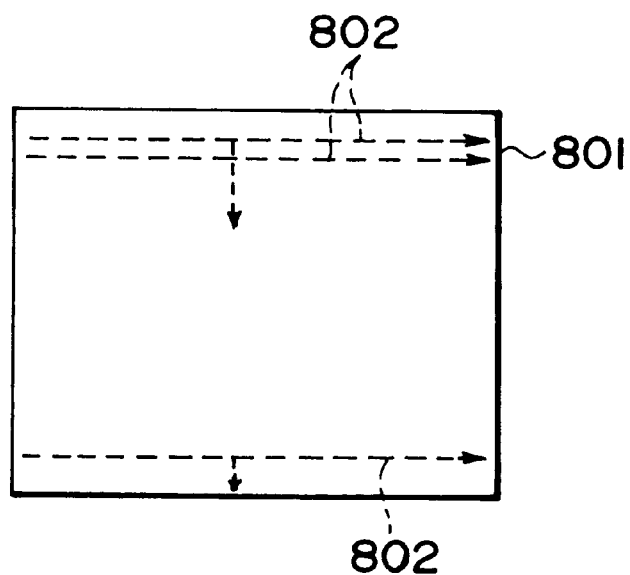
FIGS. 35A and 35B illustrate a scanning scheme according to another embodiment of the invention.
Figure 35B:
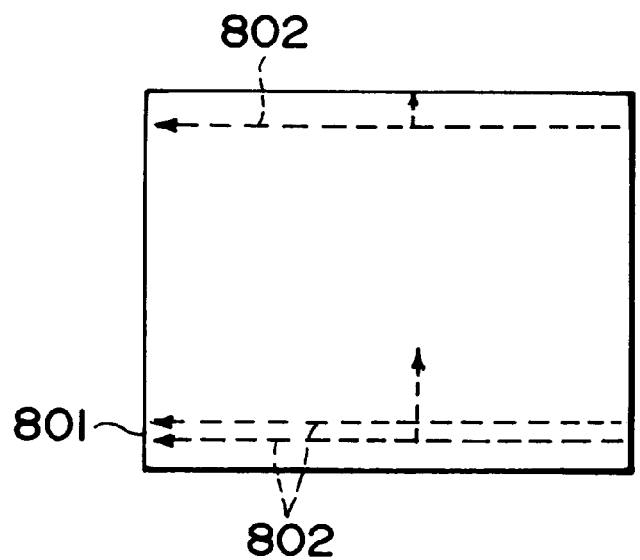

FIGS. 35A and 35B are schematic plan views of a display device for illustrating a scanning scheme. More specifically, FIGS. 35A and 35B show a reflection-type liquid crystal device identical to the one shown in FIG. 18 comprising a layer of a chiral smectic liquid crystal having a memory characteristic, and a photoconductor layer comprising an organic semiconductor and including a charge generation layer and a charge transportation layer. Writing light 802 is used for non-interlaced scanning from the upper to the lower portion in a frame operation shown in FIG. 35A and then from the lower to the upper portion in a succeeding or later frame operation shown in FIG. 35B. Thus, the illumination of the photoconductor layer of the device writing light 802 is performed time-serially. The scanning with the writing light 802 is performed in mutually different directions, particularly in vertically opposite directions, in succeeding frames, i.e., in two frames which are sequential in a time series. Herein, succeeding two frames need not be adjacent or successive series in the sense that one frame comes immediately after the other. Instead, it is possible to repeat the scanning in the direction shown FIG. 35A in a plurality of times, such as two, three, . . . , 10 times, and then repeat the scanning in the direction shown in FIG. 35B in the same polarity of times. In other words, it is only necessary to periodically change the scanning direction, and particularly to periodically invert or exchange mutually opposite vertical scanning directions, between succeeding or successive frame operations, and the change in scanning direction after each frame operation is not required while it is preferred.

The frequency of the scanning direction change should preferably be at least 30 Hz. Further, it is also possible to invert the polarity of applied voltage for each frame as in this embodiment (shown in FIGS. 36 and 37) in order to prevent the deterioration of the liquid crystal or the burning of the photoconductor layer. In this case, it is preferred to repeat the same direction of scanning for an even number of frames as in this embodiment so that the voltage polarity inversion cycle period and the scanning direction switching cycle period do not coincide with each other. Readout light having a uniform planar distribution may suitably be used for illumination when an external electric field in a polarity of switching from a first orientation or optical state giving a dark (black) state to a second orientation or optical state giving a bright (white) state is applied.

Figure 37:
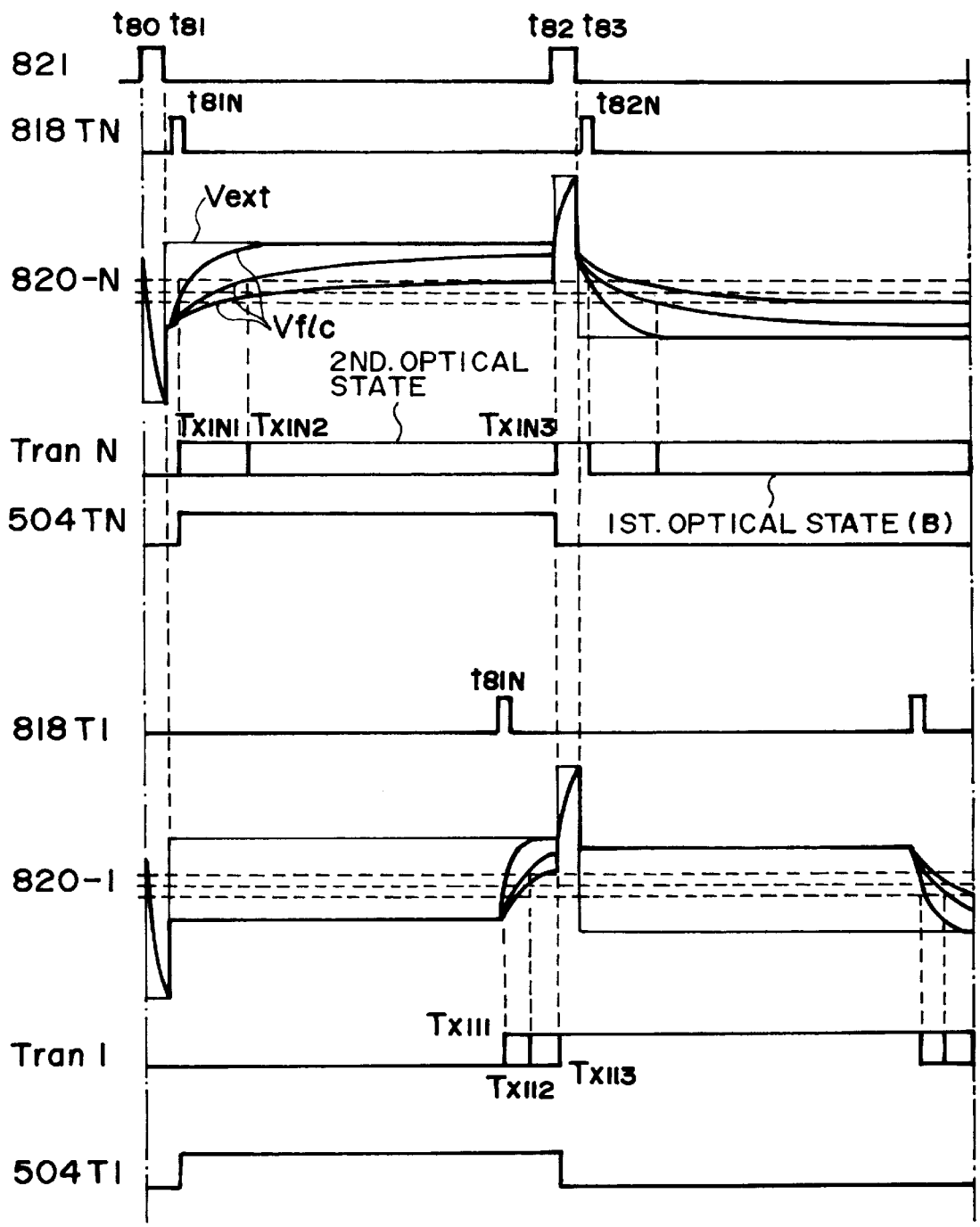

FIGS. 36 and 37 are time charts for illustrating the operation of this embodiment in further detail. FIGS. 36 and 37 correspond to the operations based on the scanning of writing light in the directions of FIGS. 35A and 35B, respectively. FIGS. 36 and 37 each illustrate an operation in one cycle period (two frames), while an operation in three cycle periods has been described in the example of FIG. 21. Further, an identical symbol (e.g., $t_{80}$) used in FIGS. 36 and 37 does not represent an identical time but is used merely for the convenience of describing a corresponding time in respective frames.

At 821 is shown an operation of reset light similar to as the one at 521 in FIG. 21. Waveforms at 818T1, 820-1, $T_{ran}$ 1 and 504T1 are shown to illustrate an operation at a pixel (1st pixel) to be first written by the writing light 802 according to non-interlaced scanning in the operation illustrated in FIG. 36 and they illustrate an operation at the pixel (1st pixel) to be last written by the writing light 802 according to non-interlaced scanning in the operation illustrated in FIG. 37.

At 818T1 is shown the operation time of the writing light 802 incident to the first pixel. At time $t_{811}$ when the first pixel is illuminated with the writing light 802, electron-hole pairs having an electric charge $\Delta Q$ proportional to the writing light intensity thereof are generated to cause a potential change $\Delta V = \Delta Q/C$. At a stronger writing light intensity, $V_{flc}$ exceeds Vu in a shorter time to cause an optical state change of FLC from a dark to a bright state. In other words, a writing-light-intensity-FLC phase conversion is performed.

FIGS. 36 and 37 respectively illustrate three cases, i.e., a case where writing light is imparted at a maximum intensity so as to take out a maximum light quantity, a case where writing light is imparted at a certain offset light intensity so as to provide a dark display state, and a case where writing light is imparted at a medium light intensity so as to take out an intermediate light quantity.

As shown at $T_{ran}$ 1, FLC causes a state change into a second optical state (bright) at time $t_{x111}$ in the case where writing light is imparted at the maximum intensity, and at time $t_{x113}$ in the case where a minimum level of writing light is imparted at a certain offset light intensity.

At 504T1 is shown an operation of readout light incident to the first pixel. When the first pixel is illuminated with the readout light for a period of $t_{x111}$ to $t_{113}$, an observer can recognize light for a period of overlapping between the readout light illumination time and the second optical state (bright) time of FLC. If the writing in and the readout from the first pixel are repeated in a cycle period shorter than that corresponding to a flickering frequency (ca. 30 Hz), the overlapping period change is recognized by the observer as a light intensity change at the first pixel.

Further, waveforms at 8181TN, 820N, $T_{ran}$ N and 504TN are shown to illustrate an operation at an N-th pixel which is written last with the writing light 802 by non-interlaced scanning in the operation shown in FIG. 36 and to illustrate an operation at the N-th pixel which is written first with the writing light 802 by non-interlaced scanning in the operation shown in FIG. 37.

The operations of the respective pixels are similar to that of the first pixel, whereas the N-th pixel is written at time $t_{81N}$. The phase conversion in the N-th pixel is intended to be performed in a shorter time, so that a stronger offset light for giving a black state is supplied than to the first pixel in FIG. 26, whereas a stronger offset light is given to the first pixel than to the N-th pixel in FIG. 37. A gradation time width (i.e., gradation period) of $T_{X1N3}-T_{X1N1}$ is available for the N-th pixel compared with a gradation time width of $T_{X113}-T_{X111}$ for the first pixel, as respectively shown in FIGS. 36 and 37.

Now, if the scanning with the writing light is performed only in the direction shown in FIG. 35A, the gradation time widths (i.e., gradation periods) are $T_{X113}-T_{X111}$ and $T_{X1N3}-T_{X1N1}$ ($<T_{X113}-T_{X111}$) giving a difference. In this embodiment, in order to compensate for the difference, in a frame succeeding to the frame for scanning shown in FIG. 35A, an opposite direction of scanning is performed as shown in FIG. 35B so as to provide gradation time widths giving an opposite relation of $(T_{X113}-T_{X111})<(T_{X1N3}-T_{X1N1})$, thereby moderating (or substantially equalizing) the gradation time widths for the respective pixels on average. As already mentioned above, the opposite writing light scanning directions need not necessarily be satisfied for immediately successive frames, but it is sufficient if the exchange of scanning directions is performed periodically during sequential frame operations so that the available (or effective) gradation periods are averagely equal or substantially equal for the respective pixels.

The embodiment described with reference to FIGS. 35–37 may be operated by a picture display system identical to the one shown in FIG. 32 including a CRT (cathode ray tube) 810 as a writing light source, an image forming lens 811, a reset light source 812, a mirror 813, a polarization beam splitter 814, a filter 816 for cutting out infrared rays and ultraviolet rays, a readout light source 817, an image reproduction screen 819 and a mirror 820.

After being illuminated with reset light, the device 801 is scanned with writing light 802. In synchronism therewith, the device 801 is supplied with a reset voltage and writing voltages sequentially. As a result, the liquid crystal is supplied with an effective voltage which varies with time depending on the illuminated light quantity due to light absorption by the photoconductor layer, so that the liquid crystal causes an optical state change at different points of time when the effective voltage exceeds the threshold, thereby providing different periods of time when the liquid crystal is placed in a reflection state depending on given gradation data.

The system shown in FIG. 32 can be similarly modified into a system shown in FIG. 34 so as to be applicable to full-color display, so that the writing light scanning means and the liquid crystal device 801 are provided for respective colors therefor, e.g., in three sets 800R, 800G and 800B for three colors of R, G and B, respectively.

The operation of the system shown in FIG. 34 is basically identical to that described with reference to FIG. 31 for the system of FIG. 32. If the writing light scanning timing is synchronized for the three colors, a full color display becomes possible according to additive color mixing. The thus-constituted display apparatus is suited for a full-color motion picture display and is therefore suitably used to constitute a large screen-size television system. The above-described embodiments have been described as using a non-interlaced scanning mode using a spot beam of writing light similarly as in a CRT, but it is also possible to effect a line-sequential writing scheme by using, e.g., a linear or two-dimensional LED array sequentially turned on and off.

In the analog duty modulation system according to the present invention, the signal applied to the optical modulation means is given as a time when the threshold for changing the optical modulation means is exceeded, and is modulated in an analog manner depending on given gradation data. As a result, the period of overlapping of the ON-time of the optical modulation means, such as a period of opening of a shutter or a period of a mirror being positioned in a prescribed direction, and the lighting period of a light source, is modulated, whereby the time-integration of the transmitted or reflected light quantity corresponds to the given gradation data. Accordingly, the number of reproducible gradation levels is not restricted by a digital quantity such as a clock pulse frequency, and the A/D conversion of gradation data becomes unnecessary. Further, even a digital (or binary) display device having a steep applied voltage-transmittance characteristic is applicable to analog modulation, which cannot be expected heretofore.

As described above, according to the present invention, good gradational display can be effected. Further, according to the present invention, the scanning with the light data is performed while exchanging mutually different (or vertically opposite) scanning directions periodically during succeeding frame operations whereby the luminance or brightness at an identical gradation level becomes uniform at any site (or portion or pixel) on the display picture area. As a result, the scanning with readout light becomes unnecessary so that the organization of the readout optical system is simplified to provide a compact and inexpensive display apparatus.

What is claimed is:

1. A driving method for an optical apparatus including an optical modulation means having a planar extension including two-dimensionally distributed optical modulation sites for modulating an optical state based on signal carrying gradation data, and readout light illumination means for illuminating the optical modulation means with readout light for reading out picture data, said driving method comprising the steps of:

line-sequentially scanning the two-dimensionally distributed optical modulation sites of the optical modulation means for determining optical modulation states and gradation periods at the respective optical modulation sites over the planar distribution of the optical modulation means; and driving the readout light illumination means to simultaneously supply readout light having a planar light intensity distribution over to the planar extension of the optical modulation means so as to provide a constant product of a gradation period and a readout light intensity at each optical modulation site of the optical modulation means.

2. A driving method according to claim 1, wherein said optical modulation means comprises a pair of electrodes for applying a voltage therebetween, and a photoconductor layer and an optical modulation substance layer disposed between the electrodes, so as to modulate the optical state of the optical modulation substance by supplying the photoconductor layer with light data carrying gradation data.

3. A driving method according to claim 1, wherein said readout light illumination means includes a correction plate for providing the planar light intensity distribution, and a light source for emitting illumination light which is caused to pass through the correction plate to illuminate the optical modulation means.

4. A driving method according to claim 2, wherein the optical modulation substance comprises a liquid crystal having a memory characteristic.

5. A driving method according to claim 2, wherein said photoconductor layer comprises an organic semiconductor.

6. A driving method according to claim 2, wherein said voltage applied between the pair of electrodes causes polarity inversion periodically.

7. A driving method for an optical apparatus including an optical modulation means comprising a pair of electrodes, and a photoconductor layer and an optical modulation substance layer disposed between the electrodes, a signal light source for supplying light data carrying gradation data to the photoconductor layer, and a readout light illumination means for supplying readout light for reading out picture data to the optical modulation substance layer, said driving method comprising:

scanning the photoconductor layer with the light data frame by frame while periodically changing the scanning direction.

8. A driving method according to claim 7, wherein the voltage applied between the pair of electrodes is subjected to polarity inversion for each prescribed cycle period.

9. A driving method according to claim 8, wherein the cycle period of the voltage polarity inversion is different from a cycle period for changing the direction of scanning with the light data.

10. A driving method according to claim 7, 8 or 9, wherein the scanning with light data is performed according to a non-interlaced mode.

11. A driving method according to claim 7, wherein the optical modulation substance comprises a liquid crystal having a memory characteristic.

12. A driving method according to claim 7, wherein said photoconductor layer comprises an organic semiconductor.

* * * * *

UNITED STATES PATENT AND TRADEMARK OFFICE
CERTIFICATE OF CORRECTION

PATENT NO. : 6,133,894
DATED : October 17, 2000
INVENTOR(S) : Mineto Yagyu

It is certified that error appears in the above-identified patent and that said Letters Patent is hereby corrected as shown below:

Column 1,
Line 20, "Accordingly" should read -- According --.
Line 35, "a real" should read -- areal --.

Column 2,
Line 30, "gradational data" should read -- gradational-data --, and "according" should read -- according to --.

Column 6,
Line 9, "$C_{CL}$" should read -- $C_{LC}$ --.
Line 11, "$C_{CL}$" should read -- $C_{LC}$ --.
Line 15, "$C_{CL}$" should read -- $C_{LC}$ --, and "subslides" should read -- subsides --.
Line 17, "$C_{CL}$" should read -- $C_{LC}$ --.
Line 26, "$C_{CL}$" should read -- $C_{LC}$ --.
Line 61, "optically different two" should read -- two optically different --.

Column 7,
Line 55, "teristic" should read -- teristics --.
Line 56, "characteristic" should read -- characteristics --.
Line 66, "substrate" should read -- substrates --.

Column 9,
Line 33, "varing" should read -- varying --.

Column 11,
Line 25, "in case case" should read -- in this case --.
Line 48, "inclusive of" should read -- including --.

Column 13,
Line 8, "depending" should read -- depending on --.
Line 22, "represent" should read -- represents --.

Column 14,
Line 9, "state each," should read -- state, each --.
Line 43, "a denotes" should read -- denotes a --.
Line 44, "a denotes" should read -- denotes a --.
Line 45, "a denotes" should read -- denotes a --.
Line 56, "ca." should read -- approximately --.

UNITED STATES PATENT AND TRADEMARK OFFICE
CERTIFICATE OF CORRECTION

PATENT NO. : 6,133,894
DATED : October 17, 2000
INVENTOR(S) : Mineto Yagyu

It is certified that error appears in the above-identified patent and that said Letters Patent is hereby corrected as shown below:

Column 15,
Line 16, "problem." should read -- problems. --.
Line 29, "Of" should read -- of --.
Line 66, "$t^{x1}-t_{63}$," should read -- $t_{x1}-t_{63}$, --.

Column 16,
Line 9, "Of" should read -- of --.
Line 52, "case the" should read -- the case --.

Column 17,
Line 50, "ca." should read -- approximately --.

Column 18,
Line 28, "an" should read -- on --.
Line 62, "area" should read -- area, --.
Line 66, "the" (2nd occurrence) should be deleted.

Column 19,
Line 17, "illuminated the" should read -- the illuminated --.
Line 35, "under" should read -- other --.
Line 59, "t he" should read -- the --.
Line 66, "an" should read -- a --.

Column 20,
Line 11, "as in" should be deleted.
Line 55, "$t_{xII}$" should read -- $t_{xIII}$ --.
Line 61, "(ca." should read -- (approximately --.

Column 21,
Line 29, "correction" should be deleted.

Column 22,
Line 59, "shown FIG. 35A in" should read -- shown in FIG. 35A --.

Column 23,
Line 26, "as" should be deleted.
Line 63, "(ca." should read -- (approximately --.

UNITED STATES PATENT AND TRADEMARK OFFICE
CERTIFICATE OF CORRECTION

PATENT NO. : 6,133,894
DATED : October 17, 2000
INVENTOR(S) : Mineto Yagyu

It is certified that error appears in the above-identified patent and that said Letters Patent is hereby corrected as shown below:

Column 25,
Line 4, "similarly as" should read -- similar to that used in --.

Signed and Sealed this

Twelfth Day of February, 2002

Attest:

JAMES E. ROGAN
*Attesting Officer*  *Director of the United States Patent and Trademark Office*